US008788206B2

(12) United States Patent
Tang

(10) Patent No.: US 8,788,206 B2
(45) Date of Patent: *Jul. 22, 2014

(54) DATA COMPRESSION TRANSFORMS FOR USE IN DOWNHOLE APPLICATIONS

(75) Inventor: Caimu Tang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1643 days.

This patent is subject to a terminal disclaimer.

(21) Appl. No.: 12/148,890

(22) Filed: Apr. 23, 2008

(65) Prior Publication Data

US 2009/0190850 A1 Jul. 30, 2009

Related U.S. Application Data

(63) Continuation-in-part of application No. 12/011,422, filed on Jan. 25, 2008, now Pat. No. 8,024,121.

(51) Int. Cl.
*G01V 1/22* (2006.01)

(52) U.S. Cl.
USPC ............................................................ 702/6

(58) Field of Classification Search
USPC ............... 702/6, 7, 9, 11, 150, 151, 189, 196; 382/232, 246, 248, 281, 253, 276
See application file for complete search history.

(56) References Cited

U.S. PATENT DOCUMENTS

| | | |
|---|---|---|
| 5,473,158 A | 12/1995 | Holenka et al. |
| 5,594,706 A | 1/1997 | Shenoy et al. |
| 6,307,199 B1 | 10/2001 | Edwards et al. |
| 6,405,136 B1 | 6/2002 | Li et al. |
| 6,567,081 B1 | 5/2003 | Li et al. |
| 6,619,395 B2 | 9/2003 | Spross |
| 7,027,926 B2 | 4/2006 | Haugland |
| 7,068,182 B2 | 6/2006 | Golla et al. |
| 7,107,153 B2 | 9/2006 | Kisra et al. |
| 7,200,492 B2 | 4/2007 | Hassan et al. |
| 7,272,504 B2 | 9/2007 | Akimov et al. |
| 7,283,910 B2 | 10/2007 | Hassan et al. |
| 8,024,121 B2 * | 9/2011 | Tang ................................ 702/6 |
| 2002/0021754 A1 | 2/2002 | Pian et al. |
| 2003/0128877 A1 | 7/2003 | Nicponski |
| 2004/0222019 A1 | 11/2004 | Estes et al. |
| 2004/0258301 A1 | 12/2004 | Payton |
| 2006/0232438 A1 | 10/2006 | Golla et al. |
| 2007/0027629 A1 | 2/2007 | Hassan et al. |
| 2007/0112521 A1 * | 5/2007 | Akimov et al. ................... 702/6 |
| 2007/0223822 A1 | 9/2007 | Haugland |

OTHER PUBLICATIONS

Huang, J. Y. and Schultheiss, P., "Block quantization of correlated Gaussian random variables," IEEE Trans. Communications System, COM-11(9): pp. 289-296, Sep. 1963.

Goyal, V. K., "Theoretical foundations of transform coding," IEEE Signal Processing Magazine, vol. 18 No. 9, Sep. 21, 2001.

(Continued)

*Primary Examiner* — Mohamed Charioui
(74) *Attorney, Agent, or Firm* — Kimberly Ballew

(57) ABSTRACT

Borehole image data is compressed and transmitted to the surface one or more pixilated traces at a time. The compression methodology typically includes transform, quantization, and entropy encoding steps. The invention advantageously provides an efficient fixed point Karhünen-Loève like transform for compressing sensor data. A significant reduction in latency is achieved as compared to the prior art.

32 Claims, 5 Drawing Sheets

(56) References Cited

OTHER PUBLICATIONS

Zeng, Y., Cheng, L., Bi, G., and Kot, A. C. "Integer DCTs and fast algorithms," IEEE Trans. on Signal Processing, 49(11): pp. 2774-2782, Nov. 2001.

Plonka, G., and Tasche., M. "Invertible integer DCT algorithms," Applied and Computational Harmonic Analysis, 15(1): pp. 70-88, Jul. 2003.

Malvar, H. S., Hallapuro, A., Karczewicz, M., and Kerofsky, L., "Low-complexity transform and quantization in H.264/AVC," IEEE Trans. Circuits Systems and Video Technology, 13(7), pp. 598-603, Jul. 2003.

He., Z., and Mitra, S., "a Unified Rate-Distortion Analysis Framework for Transform Coding," IEEE Trans. on Circuits and Systems for Video Technology, 11(2), pp. 1221-1236, Dec. 2001.

Joshi, R. L., and Fischer, T. R., "Comparison of generalized Gaussian and Laplacian modeling in DCT image coding," IEEE Signal Processing Letters, 2(5): pp. 81-82, May 1995.

Durbin, J., "The Fitting of Time-Series Models," Review of International Statistical Institute, vol. 28, No. 3. (1960), pp. 233-244.

Makhoul, John, "Linear Prediction: A Tutorial Review," Proceedings of the IEEE, vol. 63, No. 4, Apr. 1975, pp. 561-580.

Lloyd, Stuart P., "Least Square Quantization in PCM," IEEE Transactions on Information Theory, vol. IT28, No. 2, Mar. 1982, pp. 129-137.

Golub, G. H. and Van Loan, C. F., "Matrix Computations," 3rd Ed., The Johns Hopkins University Press, Baltimore, MD, 1996, pp. 391-469.

Canadian Office Action for Canadian Application No. 2,711,908 dated Mar. 25, 2014.

* cited by examiner

DATA COMPRESSION TRANSFORMS FOR USE IN DOWNHOLE APPLICATIONS

RELATED APPLICATIONS

This application is a continuation-in-part of, commonly-invented and commonly-assigned U.S. patent application Ser. No. 12/011,422 (now U.S. Pat. No. 8,024,121) entitled DATA COMPRESSION METHOD FOR USE IN DOWNHOLE APPLICATIONS, filed Jan. 25, 2008.

FIELD OF THE INVENTION

The present invention relates generally to data communication between a downhole tool deployed in a subterranean borehole and surface instrumentation. More particularly, this invention relates to downhole techniques for compressing logging while drilling image data prior to transmission to the surface.

BACKGROUND OF THE INVENTION

Logging techniques for determining numerous borehole and formation characteristics are well known in oil drilling and production applications. Such logging techniques include, for example, natural gamma ray, spectral density, neutron density, inductive and galvanic resistivity, acoustic velocity, acoustic caliper, downhole pressure, and the like. In conventional wireline logging applications, a probe having various sensors is lowered into a borehole after the drill string and bottom hole assembly (BHA) have been removed. Various parameters of the borehole and formation are measured and correlated with the longitudinal position of the probe as it is pulled uphole. More recently, the development of logging while drilling (LWD) applications has enabled the measurement of such borehole and formation parameters to be conducted during the drilling process. The measurement of borehole and formation properties during drilling has been shown to improve the timeliness and quality of the measurement data and to often increase the efficiency of drilling operations.

LWD tools are often used to measure physical properties of the formations through which a borehole traverses. Formations having recoverable hydrocarbons typically include certain well-known physical properties, for example, resistivity, porosity (density), and acoustic velocity values in a certain range. Such LWD measurements may be used, for example, in making steering decisions for subsequent drilling of the borehole. For example, an essentially horizontal section of a borehole may be routed through a thin oil bearing layer (sometimes referred to in the art as a payzone). Due to the dips and faults that may occur in the various layers that make up the strata, the drill bit may sporadically exit the oil-bearing layer and enter nonproductive zones during drilling. In attempting to steer the drill bit back into the oil-bearing layer (or to prevent the drill bit from exiting the oil-bearing layer), an operator typically needs to know in which direction to turn the drill bit (e.g., up, down, left, or right). In order to make correct steering decisions, information about the strata, such as the dip and strike angles of the boundaries of the oil-bearing layer is generally required. Such information may possibly be obtained from azimuthally sensitive measurements of the formation properties and, in particular, from images derived from such azimuthally sensitive measurements.

Downhole imaging tools are conventional in wireline applications. Such wireline tools typically create images by sending large quantities of azimuthally sensitive logging data uphole via a high-speed data link (e.g., a cable). Further, such wireline tools are typically stabilized and centralized in the borehole and include multiple (often times one hundred or more) sensors (e.g., resistivity electrodes) extending outward from the tool into contact (or near contact) with the borehole wall. It will be appreciated by those of ordinary skill in the art that such wireline arrangements are not suitable for typical LWD applications. For example, communication bandwidth with the surface is typically insufficient during LWD operations to carry large amounts of image-related data (e.g., via known mud pulse telemetry or other conventional techniques).

Several LWD imaging tools and methods have been disclosed in the prior art. Most make use of the rotation (turning) of the BHA (and therefore the LWD sensors) during drilling of the borehole. For example, U.S. Pat. No. 5,473,158 to Holenka et al. discloses a method in which sensor data (e.g., neutron count rate) is grouped by quadrant about the circumference of the borehole. Likewise, U.S. Pat. No. 6,307,199 to Edwards et al., U.S. Pat. No. 6,584,837 to Kurkoski, and U.S. Pat. No. 6,619,395 to Spros disclose similar binning methods. In an alternative approach, U.S. Pat. No. 7,027,926 to Haugland, which is commonly assigned with the present invention, discloses a method in which azimuthally sensitive sensor data are convolved with a predetermined window function. Such an approach tends to advantageously reduce image noise as compared to the above described binning techniques.

LWD data are conventionally transmitted uphole (to the surface) via mud pulse telemetry techniques. Such techniques are typically limited to data transmission rates (bandwidth) on the order of only a few bits per second. Since LWD imaging sensors typically generate data at much higher rates than is possible to transmit to the surface, borehole images are often processed from data stored in memory only after the tools have been removed from the wellbore. Significant data compression is required to transmit images to the surface during drilling. While the above described binning and windowing techniques do provide for significant data reduction, significant further data compression is necessary in order to transmit images to the surface in a timely fashion (e.g., such that the borehole images may be utilized in steering decisions). Mud pulse telemetry techniques also tend to be error prone. Thus, a suitable LWD image compression scheme requires a high degree of error resilience. Furthermore, payzone steering (with LWD) is highly sensitive to latency as a delayed response allows the drill bit to potentially continue drilling in the wrong direction. Hence, low latency compression and transmission is highly desirable.

Transform coding techniques are known in the art. For example, U.S. Pat. No. 6,405,136 to Li et al. discloses a method for compressing borehole image data, which includes generating a two-dimensional Fourier Transform of a frame of data, transmitting a quantized representation of some of the Fourier coefficients to the surface, and applying a forward Fourier Transform to the coefficients to recover an approximate image at the surface. The use of discrete cosine transforms (DCT) and wavelet transforms are also known in the art. One drawback with the Li et al approach is that relatively large, two-dimensional data frames (16×56) are required in order to get sufficient compression, which thereby increases data latency (the time delay between when the data is generated downhole and received at the surface).

Therefore there exists a need for an improved data compression method, and in particular a data compression method suitable for sufficiently compressing LWD image data so that the compressed data may be transmitted to the surface via conventional telemetry techniques.

SUMMARY OF THE INVENTION

The present invention addresses one or more of the above-described drawbacks of prior art data compression and communication techniques. Aspects of this invention include a method for logging a subterranean borehole during drilling in which one or more pixilated traces of sensor data are compressed and transmitted to the surface. Exemplary embodiments of the invention re-organize the pixilated traces of sensor data to obtain at least one two-dimensional square matrix of pixels prior to compression. Exemplary embodiments of the invention make use of an efficient Karhünen-Loève transform or a fixed point Karhünen-Loève like transform to remove data redundancy. Such transforms may be computed downhole during drilling based on the covariance of the sensor data. Suitable transforms may also be stored in downhole firmware.

Exemplary embodiments of the present invention may advantageously provide several technical advantages. For example, exemplary methods according to this invention typically provide for sufficient data compression to enable conventional telemetry techniques (e.g., mud pulse telemetry) to be utilized for transmitting borehole images to the surface. Moreover, exemplary embodiments of the present invention advantageously compress and transmit sensor data trace by trace (i.e., one trace at a time), which tends to significantly reduce latency. Alternative embodiments compress a small number of traces simultaneously so that a balance between latency and compression efficiency may be achieved. Exemplary embodiments in accordance with the invention also tend to significantly reduce computational requirements during compression (as compared to prior art methods) by making use of a fixed point Karhünen-Loève like transform and therefore may be advantageously utilized in LWD applications in which computational resources tend to be limited.

In one aspect the present invention includes a method for logging a subterranean borehole. The method includes acquiring a pixilated trace of sensor data, the pixilated trace including a plurality of borehole parameter values at a corresponding plurality of discrete tool face angles. A non-orthogonal, KLT-like transform is applied to the pixilated trace to obtain transform coefficients. The transform is selected such that the transform times its transpose equals a diagonal scaling matrix. The method further includes quantizing the transform coefficients to obtain quantized coefficients and transmitting the quantized coefficients uphole.

In another aspect, the invention includes a method for logging a subterranean borehole. The method includes acquiring a plurality of pixilated traces of sensor data, each of the pixilated traces including a plurality of borehole parameter values at a corresponding plurality of discrete tool face angles. The plurality of borehole parameter values in the plurality of traces are re-organized to obtain a square matrix of parameter values. The size of the square matrix is greater than the number of acquired pixilated traces. A non-orthogonal, KLT-like transform is applied to the square matrix of parameter values to obtain a square matrix of transform coefficients. The transform is selected such that the transform times its transpose equals a diagonal scaling matrix. The method further includes quantizing the transform coefficients to obtain quantized coefficients and transmitting the quantized coefficients uphole.

In a further aspect, the invention includes a method for logging a subterranean borehole. The method includes acquiring at least one pixilated trace of sensor data, the pixilated trace including a plurality of borehole parameter values at a corresponding plurality of discrete tool face angles. The method further includes processing the at least one pixilated trace of sensor data to obtain a transform matrix. The transform matrix obtained via processing the sensor data is then applied to the at least one pixilated trace of sensor data to obtain transform coefficients. The method further includes quantizing the transform coefficients to obtain quantized coefficients and transmitting the transform matrix and the quantized coefficients uphole.

In still another aspect, the invention includes a method for logging a subterranean borehole. The method includes acquiring at least one pixilated trace of sensor data, the pixilated trace including a plurality of borehole parameter values at a corresponding plurality of discrete tool face angles. The at least one pixilated trace of sensor data is quantized to obtain quantized sensor data. A non-orthogonal, KLT-like transform is applied to the quantized sensor data to obtain transform coefficients. The method further includes quantizing the transform coefficients to obtain quantized coefficients and transmitting the quantized coefficients uphole.

In yet another aspect, the invention includes a method for logging a subterranean borehole. The method includes acquiring at least one pixilated trace of sensor data, the pixilated trace including a plurality of borehole parameter values at a corresponding plurality of discrete tool face angles. The sensor data is azimuthally partitioned to obtain a plurality of blocks of sensor data, the plurality of blocks including a first block and at least one other block. At least on block of residuals is obtained by computing differences between each of the at least one other blocks and the first block. A transform is applied to the first block to obtain a first block of transform coefficients and to each of the at least one block of residuals to obtain at least one block of residual transform coefficients. The first block of transform coefficients and the at least one block of residual transform coefficients are quantized to obtain a first block of quantized coefficients and at least one block of residual quantized coefficients. The method further includes transmitting the first block of quantized coefficients and the at least one block of residual quantized coefficients uphole.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
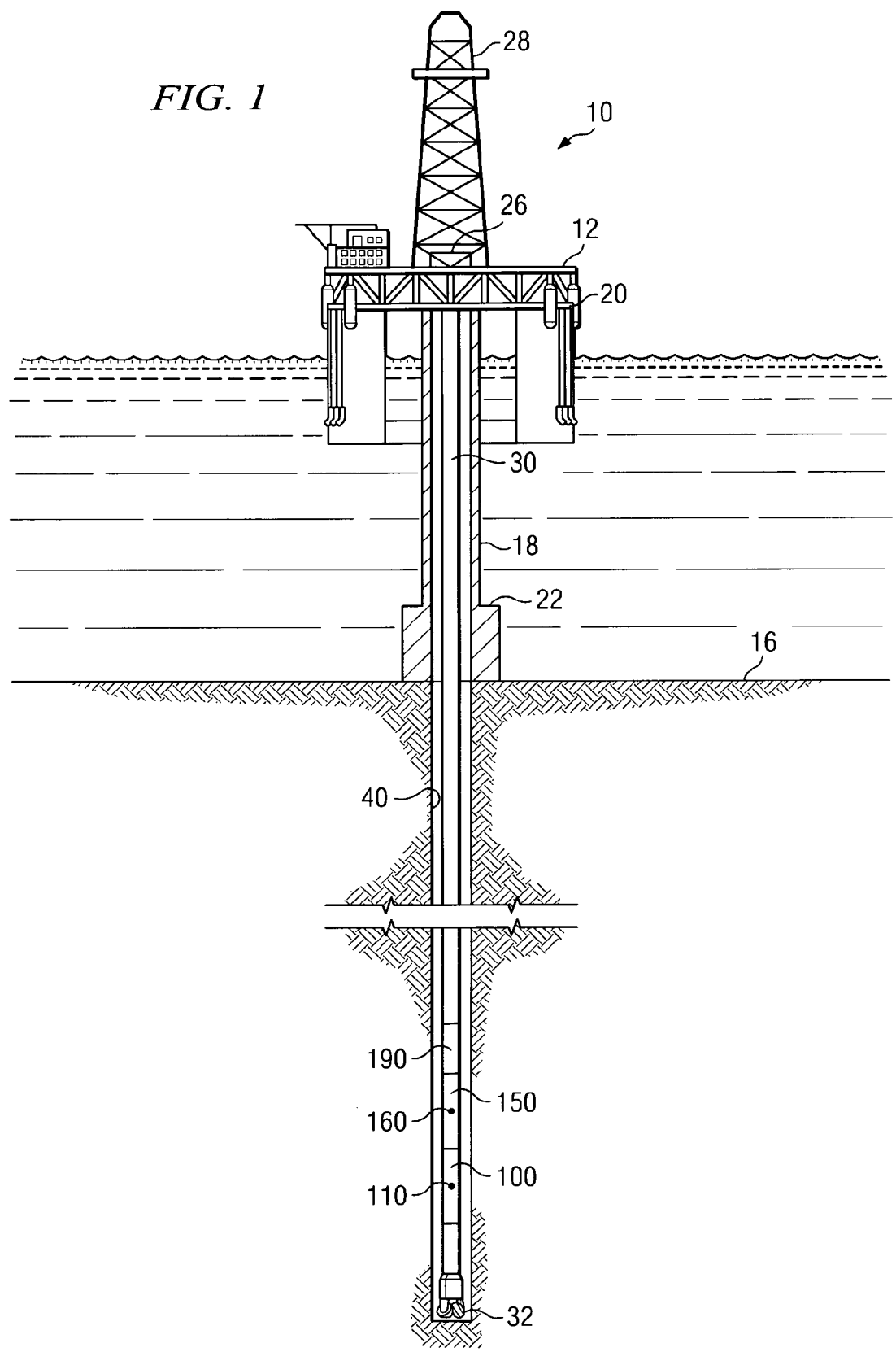
FIG. 1 depicts one exemplary LWD tool deployed in a borehole and suitable for use in accordance with aspects of this invention.

Before proceeding with a discussion of the present invention, it is necessary to make clear what is meant by "azimuth" as used herein. The term azimuth has been used in the downhole drilling art in two contexts, with a somewhat different meaning in each context. In a general sense, an azimuth angle is a horizontal angle from a fixed reference position. Mariners performing celestial navigation used the term, and it is this use that apparently forms the basis for the generally understood meaning of the term azimuth. In celestial navigation, a particular celestial object is selected and then a vertical circle, with the mariner at its center, is constructed such that the circle passes through the celestial object. The angular distance from a reference point (usually magnetic north) to the point at which the vertical circle intersects the horizon is the azimuth. As a matter of practice, the azimuth angle was usually measured in the clockwise direction.

It is this meaning of "azimuth" that is used to define the course of a drilling path. The borehole inclination is also used in this context to define a three-dimensional bearing direction of a point of interest within the borehole. Inclination is the angular separation between a tangent to the borehole at the point of interest and vertical. The azimuth and inclination values are typically used in drilling applications to identify bearing direction at various points along the length of the borehole. A set of discrete inclination and azimuth measurements along the length of the borehole is further commonly utilized to assemble a well survey (e.g., using the minimum curvature assumption). Such a survey describes the three-dimensional location of the borehole in a subterranean formation.

A somewhat different meaning of "azimuth" is found in some borehole imaging art. In this context, the azimuthal reference plane is not necessarily horizontal (indeed, it seldom is). When a borehole image of a particular formation property is desired at a particular depth within the borehole, measurements of the property are taken at points around the circumference of the measurement tool. The azimuthal reference plane in this context is the plane centered at the center of the measurement tool and perpendicular to the longitudinal direction of the borehole at that point. This plane, therefore, is fixed by the particular orientation of the borehole at the time the relevant measurements are taken.

An azimuth in this borehole imaging context is the angular separation in the azimuthal reference plane from a reference point to the measurement point. The azimuth is typically measured in the clockwise direction, and the reference point is frequently the high side of the borehole or measurement tool, relative to the earth's gravitational field, though magnetic north may be used as a reference direction in some situations. Though this context is different, and the meaning of azimuth here is somewhat different, this use is consistent with the traditional meaning and use of the term azimuth. If the longitudinal direction of the borehole at the measurement point is equated to the vertical direction in the traditional context, then the determination of an azimuth in the borehole imaging context is essentially the same as the traditional azimuthal determination.

Another important label used in the borehole imaging context is the "tool face angle". When a measurement tool is used to gather azimuthal imaging data, the point of the tool with the measuring sensor is identified as the "face" of the tool. The tool face angle, therefore, is defined as the angular separation from a reference point to the radial direction of the tool face. The assumption here is that data gathered by the measuring sensor will be indicative of properties of the formation along a line or path that extends radially outward from the tool face into the formation. The tool face angle is an azimuth angle, where the measurement line or direction is defined for the position of the tool sensors. In the remainder of this document, the terms azimuth and tool face angle will be used interchangeably.

With reference now to FIG. 1, an exemplary offshore drilling assembly, generally denoted 10, suitable for employing exemplary method embodiments in accordance with the present invention is illustrated. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a bottom hole assembly (BHA) having a drill bit 32, a measurement/logging while drilling (MLWD) tool 100, an imaging sub 150, and a telemetry sub 190 coupled thereto.

It will be appreciated that as used in the art, there is not always a clear distinction between the terms LWD and MWD. However, MWD often refers to measurements taken for the purpose of drilling the well (e.g., navigation measurements) and characterizing the borehole (e.g., via caliper measurements), whereas LWD often refers to measurement taken for the purpose of analysis of the formation and surrounding borehole conditions (e.g., formation property measurements including resistivity, acoustic velocity, and neutron density measurements). Notwithstanding, the term "LWD" will be used herein to refer to both MWD and LWD measurements. The term "logging" likewise refers herein to both formation and borehole property measurements.

LWD tool 100 typically includes at least one LWD sensor 110 deployed thereon. LWD sensor 110 may include substantially any downhole logging sensor, for example, including a natural gamma ray sensor, a neutron sensor, a density sensor, a resistivity sensor, a formation pressure sensor, an annular pressure sensor, an ultrasonic sensor, an audio-frequency acoustic sensor, and the like. Imaging sub 150 includes at least one tool face (azimuth) sensor 160 deployed thereon. Tool face sensor 160 may include substantially any sensor that is sensitive to sensor tool face (e.g., relative to the high side of the borehole, magnetic north, etc.), such as one or more accelerometers and/or magnetometers. As described in more detail below, LWD tool 100 and imaging sub 150 may be configured to acquire azimuthally sensitive sensor measurements of one or more borehole properties (e.g., formation resistivity). Telemetry sub 190 may include substantially any conventional telemetry system for communicating with the surface, such as a mud pulse telemetry system and may likewise employ substantially any suitable encoding scheme. Drill string 30 on FIG. 1 may further include a downhole drill motor and other logging and/or measurement while drilling tools, such as surveying tools, formation sampling tools, directional drilling tools, and the like.

It will be understood by those of ordinary skill in the art that methods in accordance with the present invention are not limited to use with a semisubmersible platform 12 as illustrated in FIG. 1. Methods in accordance with this invention are equally well suited for use with any kind of subterranean drilling operation, either offshore or onshore.

LWD tool 100 may further optionally include an energy source (not shown). For example, an LWD tool configured for azimuthal gamma measurements may include a gamma radiation source (such a device is typically referred to as a density measurement device). Likewise, LWD tools configured for azimuthal resistivity and acoustic velocity measurements may include one or more electromagnetic wave generators and acoustic transmitters, respectively. The invention is not limited, however, to the use of an energy source since the LWD sensor 110 may be utilized to measure naturally occurring formation parameters (e.g., a natural gamma ray sensor may be utilized to measure azimuthally sensitive natural gamma ray emissions).

In the exemplary embodiment shown in FIG. 1, the LWD sensor 110 and the tool face sensor 160 are deployed in separate tools. It will be appreciated that the invention is not limited in this regard. For example, LWD tool 100 may include a tool face sensor deployed therein. Tool face sensor 160 may also be deployed elsewhere in the drill string 30.

With continued reference to FIG. 1, downhole tool 100 and/or imaging sub 150 typically further includes a controller (not shown), e.g., having a programmable processor (not shown), such as a microprocessor, digital signal processor, or a microcontroller and processor-readable or computer-readable program code embodying logic. A suitable processor may be utilized, for example, to pixilate traces of sensor data. The processor is typically further utilized to compress the data in accordance with this invention, for example, by applying a suitable transform to the sensor data. The processor may be further utilized to encode the compressed data prior to transmission to the surface. A suitable controller may also optionally include other controllable components, such as sensors (e.g., a depth sensor), data storage devices, power supplies, timers, and the like. The controller is also typically disposed to be in electronic communication with sensors 110 and 160. A suitable controller may also optionally communicate with other instruments in the drill string, such as telemetry sub 190. A typical controller may further optionally include volatile or non-volatile memory or a data storage device.

In general, an image may be thought of as a two-dimensional representation of a parameter value. A borehole image is typically thought of as a two-dimensional representation of a measured formation (or borehole) parameter as a function of sensor tool face and time. Time is typically correlated with a borehole depth value at the surface because such a borehole depth value is typically not accessible within the imaging sub. Such borehole images thus convey the dependence of the measured formation (or borehole) parameter on tool face and depth. It will therefore be appreciated that one purpose in forming such images of particular formation or borehole parameters (e.g., formation resistivity, dielectric constant, density, acoustic velocity, standoff, etc.) is to determine the actual azimuthal dependence of such parameters as a function of the borehole depth. Exemplary embodiments of this invention may advantageously enable timely transmission of such dependencies to the surface.

Figure 2:
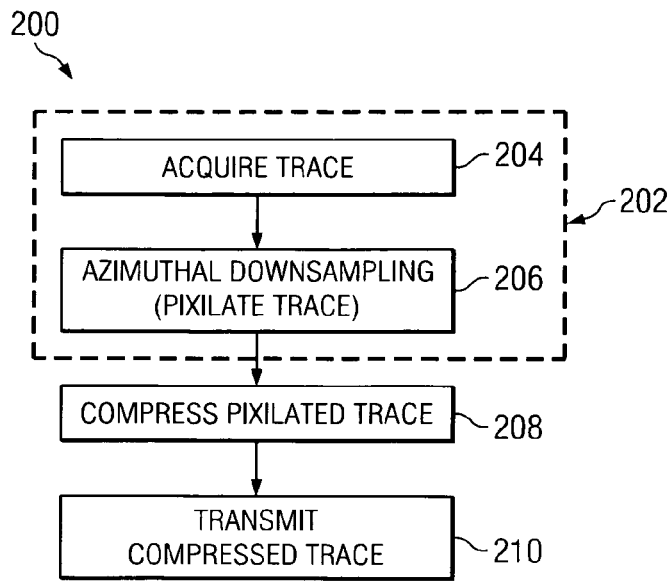
FIG. 2 depicts a flowchart of one exemplary method embodiment in accordance with the present invention.

With reference now to FIG. 2, one exemplary embodiment of a data compression method 200 in accordance with the present invention is illustrated. In the exemplary embodiment shown, a single, pixilated trace of sensor data is acquired at 202. This pixilated trace is then compressed in accordance with the invention at 208 and transmitted to the surface at 210. It will be appreciated that exemplary embodiments of the present invention advantageously compress and transmit (at 208 and 210) a single trace of sensor data. In alternative embodiments, a plurality of traces may be compressed simultaneously. In contrast to the present invention, prior art methods, (e.g., those described above) require the compression of a large number of traces (e.g., 8 or 16), which tends to increase latency.

With continued reference to the exemplary embodiment shown on FIG. 2, the pixilated trace of sensor data may be acquired at 202, for example, via azimuthally down-sampling 206 the raw sensor data acquired at 204. Exemplary azimuthal down-sampling techniques include conventional binning or windowing techniques (commonly assigned U.S. Pat. No. 7,027,926 to Haugland discloses a suitable windowing technique). Raw sensor data may be acquired 204, for example, via one or more sensors deployed on an outer surface of an LWD tool deployed in a borehole (e.g., sensor 110 on LWD tool 100 shown on FIG. 1). As is known to those of ordinary skill in the art, such sensors are typically disposed to make substantially continuous measurements of a formation property (adjacent the sensor) as the LWD tool rotates (with the drill string) in the borehole. In one exemplary embodiment, a continuous LWD sensor response may be averaged at some predetermined sampling interval (e.g., 10 milliseconds). The duration of each sampling interval is preferably significantly less than the period of the tool rotation in the borehole (e.g., the sampling interval may be about 10 milliseconds, as stated above, while the rotational period of the tool may be about 0.5 seconds). Meanwhile, a tool face sensor (e.g., sensor 160 shown on FIG. 1) continuously measures the tool face of the LWD sensor as it rotates in the borehole. The averaged LWD sensor response in each of the sampling intervals may then be tagged with a corresponding tool face and time and saved to memory.

Sensor data for determining the azimuthal dependence of the measured formation parameter at a particular (single) well depth are typically gathered and grouped during a predetermined time period. The predetermined time period is typically significantly longer than both the above described rapid sampling time and the rotational period of the tool (e.g., the time period may be 10 seconds, which is 1000 times longer than the 10 millisecond rapid sampling time and 20 times longer than the 0.5 second rotational period of the tool). The data acquired during the single time period (e.g., within the 10 second interval) represents a single "trace" of sensor data. Each trace of data is typically azimuthally down-sampled 206 (FIG. 2) via a conventional binning or windowing algorithm after acquisition. Such down-sampling essentially pixilates the trace in azimuth (tool face). For example, a single trace of sensor data acquired at 204 may include 1000 data pairs (a single data pair every 10 milliseconds over an interval of 10 seconds). At 206, these data pairs may be azimuthally down-sampled, for example, into 16 discrete azimuthal pixels. Of course, the invention is not limited to any number of azimuthal pixels. Nor is the invention limited to any particular rapid sampling and/or time periods. The invention is also not limited to the use of any particular windowing or binning algorithms.

To form a two-dimensional image, it will be understood that multiple pixilated traces are required. Such traces are typically acquired during consecutive time periods (although the invention is not limited in this regard). As described above, prior art compression algorithms require the compression of a two-dimensional image (i.e., including numerous pixilated traces). Such a methodology necessarily tends to result in unacceptably high latency. In contrast to the prior art, exemplary embodiments of the present invention compress and transmit the data one pixilated trace at a time (as shown at 208 and 210 of FIG. 2). The invention therefore advantageously significantly reduces latency.

Although the exemplary image acquisition technique described above involves rotating a sensor in the borehole, it will be understood that the invention is not limited in this regard either. Images may also be obtained, for example, in sliding mode by utilizing downhole tools having multiple sensors distributed about the periphery of the tool.

Figure 3:
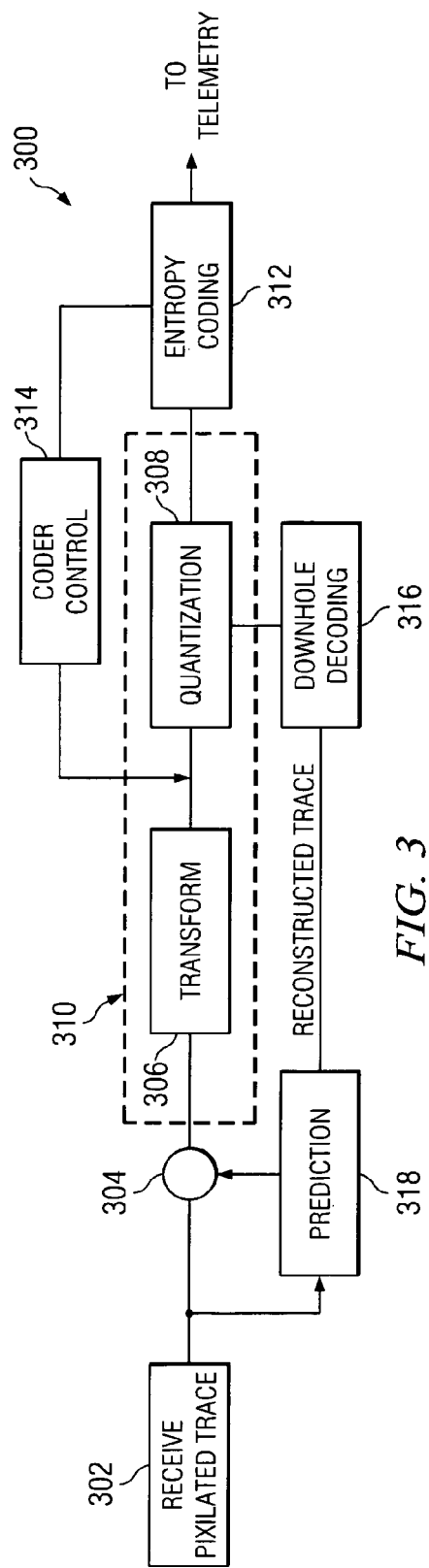
FIG. 3 depicts a flowchart of one exemplary data encoding embodiment in accordance with the present invention.
Figure 4:
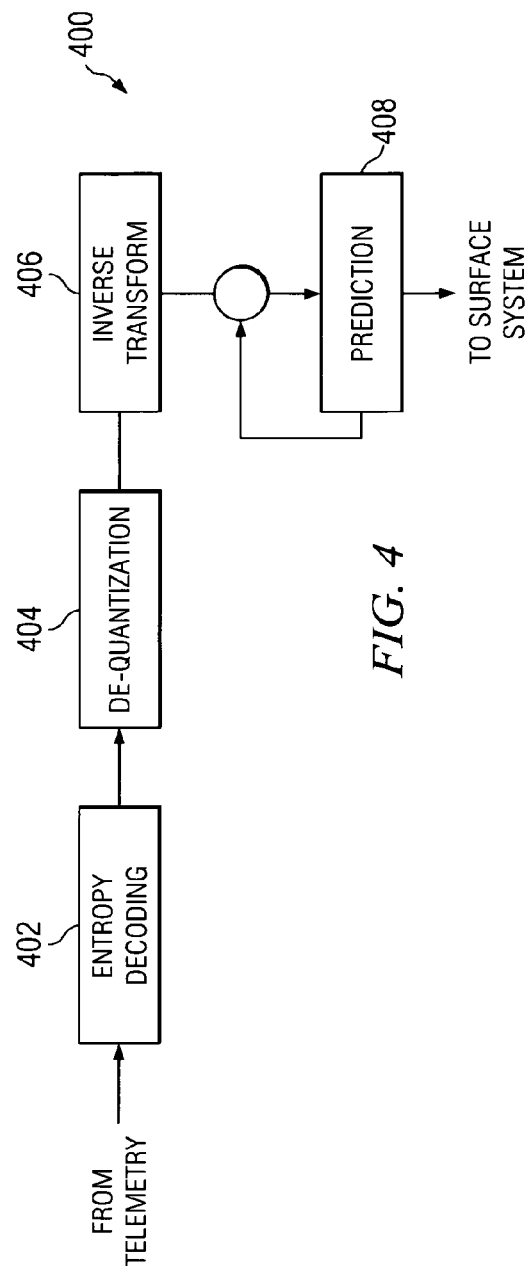
FIG. 4 depicts a flowchart of one exemplary data decoding embodiment in accordance with the present invention.

With reference now to FIGS. 3 and 4, the basic structures of exemplary downhole encoding (FIG. 3) and surface decoding (FIG. 4) embodiments are shown. As shown, the encoder 300 is configured to output a bit stream to the downhole telemetry system while the decoder 400 is configured to receive the bit stream at the surface and reconstruct the pixilated trace.

The exemplary encoder 300 shown on FIG. 3 may be thought of as including four blocks (or four major components): (i) transform and quantization shown at 310, (ii) entropy coding shown at 312, (iii) prediction and downhole decoding shown at 316 and 318 and (iv) coder control shown at 314. These encoding blocks are described in more detail below under separate headings. In the exemplary embodiment shown, the encoder first compares the incoming pixilated trace 302 to a decoded prediction of the previous pixilated trace at 304. The residuals are then transformed and quantized at 306 and 308 to obtain quantized coefficients of the residuals. The transform step 306 and quantization step 308 are shown as (and may be thought of as) a joint operation at 310 for reasons discussed in more detail below in JOINT TRANSFORM AND QUANTIZATION DESIGN. The quantized coefficients are then entropy coded at 312 and output a bit stream representative of the quantized coefficients to the downhole telemetry system. The exemplary embodiment shown includes a coder control block 314 for maintaining the bit stream at a substantially constant rate (i.e., an approximately constant number of bits per pixilated trace). A downhole decoding 316 and prediction 318 block decodes the quantized coefficients and predicts a reconstructed pixilated trace for comparison with the next pixilated trace at 304. It will be appreciated that the invention is not limited to encoding embodiments including each of the above described four blocks. For example, suitable embodiments of the invention may include only the transform/quantization block shown at 310. Other suitable embodiments may include only two or three of the four blocks.

The exemplary decoder 400 shown on FIG. 4 first performs an entropy decoding process for the quantized coefficients at 402, followed by a de-quantization process to recover the coefficients at 404. The decoder then performs an inverse transform 406 on the recovered coefficients to obtain the reconstructed residuals. The reconstructed residuals are then combined with the predictor from a previous trace at 408 to ultimately reconstruct the pixilated trace. In the exemplary embodiment shown, the prediction model 408 utilizes both the predictor and the reconstructed residuals to generate the pixilated trace. It will be appreciated that the invention is not limited by the above described decoder 400. Those of skill in the art will readily appreciate that a suitable decoder does not necessarily include elements beyond those that are necessary to decode the bit stream output from the encoder 300.

Joint Transform and Quantization

As described above, exemplary embodiments of the present invention compress and transmit LWD image data one pixilated trace at a time. As described in more detail below, multiple traces may also be compressed and transmitted simultaneously. In one exemplary embodiment of the invention, such compression includes transforming the trace with a two-dimensional transform such as a Karhünen-Loève like transform (a KL-like transform). In these embodiments, the one-dimensional trace is typically first reorganized into a two-dimensional form to enable more efficient compression. It will be appreciated that the individual pixels in an LWD trace reflect formation characteristics at various azimuthal positions around a circular borehole. Thus, the first pixel is not only closely correlated with the second pixel, but also with the last pixel (i.e., the trace is continuous such that pixel a0 is a nearest neighbor with both a1 and a15 in FIG. 5A). One aspect of the present invention is the realization that this circular autocorrelation of an LWD trace enables reorganization of the trace from a one-dimensional to a two-dimensional matrix. By reorganizing the pixilated trace into a two-dimensional format, a two-dimensional transform can better compact the signal energy into fewer large coefficients, which tends to facilitate better compression of the trace with better exploitation of the data correlation.

Figure 5A:
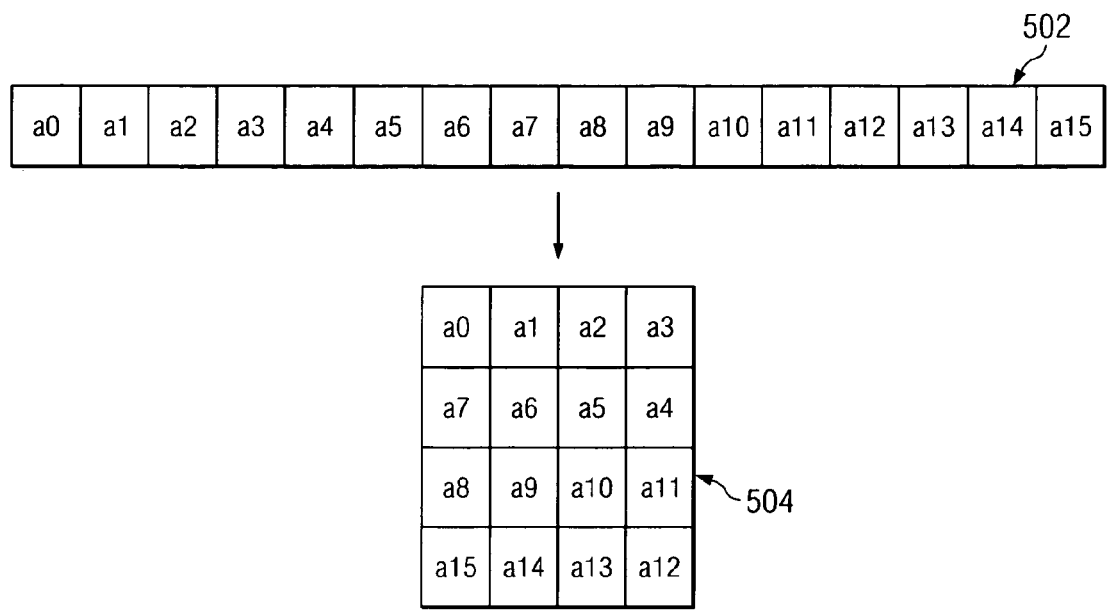
FIGS. 5A and 5B depict exemplary data reorganizing schemes in accordance with the present invention.
Figure 5B:
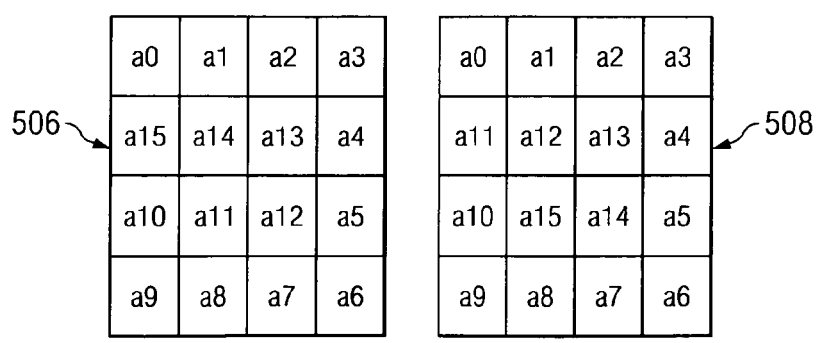

Turning now to FIG. 5A, one exemplary embodiment of a data reorganization scheme is illustrated. In the exemplary embodiment shown, a 16-pixel trace 502 is reorganized into a two-dimensional 4×4 matrix 504. As shown the trace runs forward in rows 0 and 2 and backwards in rows 1 and 3. By this reorganization, pixel a0 is only three pixels removed from pixel a15 (as compared to 15 pixels in the linear representation). Moreover, each of the other pixels has their closest correlated pixels as direct neighbors along either a row or a column. In actual implementation, such reorganization is efficiently realized by two look-up tables: (i) on a block-scan table for the forward transform and (ii) an inverse block-scan table for the inverse transform in which the scanning tables map between one-dimensional positions and two-dimensional coordinates. It will be understood that since the data reorganization may be accomplished via such look-up tables, there is no need to show a data reorganization step in FIG. 3. It will also be understood by those of ordinary skill in the art that the invention is not limited to the particular re-organization scheme 504 shown on FIG. 5A. Other re-organization schemes may likewise be utilized. For example, two alternative reorganization schemes 506 and 508 are shown on FIG. 5B. Reorganization schemes 506 and 508 are similar to scheme 504 in that the interior pixels (a1 through a14) have their closest correlated pixels as direct neighbors along either a row or a column. In scheme 506 all of the pixels (a0 through a15) have their closest correlated pixels as direct neighbors. Those of ordinary skill in the art will readily be able to conceive of still further alternative reorganization schemes. Such alternative embodiments are considered to be well within the scope of the invention.

It will also be appreciated that similar reorganization schemes may also be utilized for traces having substantially any number of pixels. For example, a trace with nine pixels may be reorganized into a two-dimensional 3×3 matrix. Likewise a trace having 25 pixels may be reorganized into a two-dimensional 5×5 matrix, or a trace having 36 pixels may be reorganized into a two-dimensional 6×6 matrix and so on.

With reference again to FIG. 3, the reorganized data may be transformed, for example, as follows:

$$Y = H_F(XH_F^T) \qquad \text{Equation 1}$$

where X represents a two-dimensional matrix of the reorganized trace (for example as shown on FIGS. 5A and 5B), Y represents the transformed trace (also referred to as the coefficients), $H_F$ represents a suitable two-dimensional, forward transform, and $H_F^T$ represents the transpose of the forward transform.

In Equation 1, $H_F$ may include substantially any suitable transform, for example, including Karhünen-Loève, Discrete Cosine, and wavelet transforms. Certain advantageous embodiments utilize a non-orthogonal transform. Those of ordinary skill in the art will readily recognize that a non-orthogonal transform is one in which the transform matrix times its transpose does not equal the identity matrix. In preferred embodiments of the invention a non-orthogonal, KL-like transform is utilized. Relaxation of the orthogonality constraint advantageously enables the transform matrix elements to be selected such that (i) efficient computation of Equation 1 may be realized and (ii) the circular symmetry commonly observed in LWD data may be maintained. Due to the limited processing power of typical downhole processors, efficient computation of Equation 1 is important for achieving low latency compression and transmission of the LWD sensor data. Such efficient computation may be further achieved, for example, via selecting a fixed point transform having rational, or more preferably integer, transform matrix elements.

Preferred embodiments of the invention utilize a fixed point, non-orthogonal KL-like transform selected such that Equation 2 is satisfied:

$$H_F H_F^T = \text{diag}[\bullet] \qquad \text{Equation 2}$$

where $H_F$ and $H_F^T$ are defined with respect to Equation 1 and diag[•] represents a diagonal matrix having rational scaling factors. The scaling factors are advantageously (but not necessarily) close to one another (e.g., within a factor of two or three). Those of ordinary skill in the art will readily recognize that the constraint given in Equation 2 may be similarly expressed with the inverse matrix $H_I$ replacing the transpose matrix $H_F^T$ which results in a diagonal matrix having modified scaling factors. Those of ordinary skill in the art will also readily recognize that the constraint given in Equation 2 may be similarly expressed as follows:

$$H_F^T \text{diag}'[\bullet] H_F = I \qquad \text{Equation 3}$$

where I represents the identity matrix and diag'[•] represents a diagonal matrix in which each of the scaling factors is the inverse of those in diagonal matrix diag[•] (Equation 2).

As stated above, efficient computation using fixed-point operations may be achieved by selecting transforms having rational, preferably integer, transform matrix elements. Such a constraint typically results in a non-orthogonal transform. As also stated above, the transform matrix may be advantageously selected such that $H_F H_F^T$ is diagonal (Equation 2). This enables a quantization scheme to compensate (scale) a given column and/or row after the transformation step. The design of KLT and KL-like transforms is described in more detail below in TRANSFORMATION MATRIX DESIGN.

One exemplary embodiment of a generic 3×3 transform matrix and its corresponding diagonal matrix that satisfy Equation 2 may be represented mathematically, for example, as follows:

$$H_{F3} = \begin{pmatrix} a & a & a \\ b & -2b & b \\ c & 0 & -c \end{pmatrix}, \text{diag}[\bullet] = \begin{pmatrix} 3a^2 & 0 & 0 \\ 0 & 6b^2 & 0 \\ 0 & 0 & 2c^2 \end{pmatrix} \qquad \text{Equation 4}$$

where $H_{F3}$ represents the generic 3×3 forward transform, a, b, and c, represent positive rational numbers, and diag[•] represents a diagonal matrix having scaling factors $3a^2$, $6b^2$, and $2c^2$.

One exemplary embodiment of a generic 4×4 transform matrix and its corresponding diagonal matrix that satisfy Equation 2 may be represented mathematically, for example, as follows:

$$H_{F4} = \begin{pmatrix} a & a & a & a \\ b & c & -c & -b \\ a & -a & -a & a \\ c & -b & b & -c \end{pmatrix}, \qquad \text{Equation 5}$$

$$\text{diag}[\bullet] = \begin{pmatrix} 4a^2 & 0 & 0 & 0 \\ 0 & 2(b^2+c^2) & 0 & 0 \\ 0 & 0 & 4a^2 & 0 \\ 0 & 0 & 0 & 2(b^2+c^2) \end{pmatrix}$$

where $H_{F4}$ represents the generic 4×4 forward transform, a, b, and c, represent positive rational numbers, and diag[•] represents a diagonal matrix having scaling factors $4a^2$ and $2(b^2+c^2)$.

One exemplary embodiment of a generic 5×5 transform matrix and its corresponding diagonal matrix that satisfy Equation 2 may be represented mathematically, for example, as follows:

$$H_{F5} = \begin{pmatrix} a & a & a & a & a \\ b & -b & 0 & -b & b \\ c & d & 0 & -d & -c \\ e & e & -4e & e & e \\ d & -c & 0 & c & -d \end{pmatrix}, \qquad \text{Equation 6}$$

$$\text{diag}[\bullet] = \begin{pmatrix} 5a^2 & 0 & 0 & 0 & 0 \\ 0 & 4b^2 & 0 & 0 & 0 \\ 0 & 0 & 2(c^2+d^2) & 0 & 0 \\ 0 & 0 & 0 & 20e^2 & 0 \\ 0 & 0 & 0 & 0 & 2(c^2+d^2) \end{pmatrix}$$

where $H_{F5}$ represents the generic 5×5 forward transform, a, b, c, d, and e represent positive rational numbers, and diag[•] represents a diagonal matrix having scaling factors $5a^2$, $4b^2$, $2(c^2+d^2)$, and $20e^2$.

In general there are many suitable transforms for each of the generic 3×3, 4×4, and 5×5 cases since each of a, b, c, d, and e may be set equal to a wide range of rational numbers. In general, transforms in which each of a, b, c, d, and e are integer values are preferred. Moreover, advantageous transforms have scaling factors that are close to one another (e.g., within a factor of two or three) so that the quantization compensation process can be most effectively performed and truncation error (if any) is minimal and uniform across all pixels. Advantageous transforms also preferably include a small dynamic range of output coefficients (e.g., well within 16 bits for use with a typical digital signal processor). A small dynamic range may be achieved, for example, by configuring the transform to include small, integer transform elements (e.g., each element being less than or equal to about 8).

Based on the above considerations, most preferred 3×3, 4×4, and 5×5 transform matrices may be represented mathematically, for example, as follows:

$$H_{F3} = \begin{pmatrix} 4 & 4 & 4 \\ 3 & -6 & 3 \\ 5 & 0 & -5 \end{pmatrix}, H_{I3} = \begin{pmatrix} 1 & 1 & 1 \\ 1 & -2 & 0 \\ 1 & 1 & -1 \end{pmatrix} \quad \text{Equation 7}$$

$$H_{F4} = \begin{pmatrix} 4 & 4 & 4 & 4 \\ 5 & 2 & -2 & -5 \\ 4 & -4 & -4 & 4 \\ 2 & -5 & 5 & -2 \end{pmatrix}, \quad \text{Equation 8}$$

$$H_{I4} = \begin{pmatrix} 1 & 5/2 & 1 & 1 \\ 1 & 1 & -1 & -5/2 \\ 1 & -1 & -1 & 5/2 \\ 1 & -5/2 & 1 & -1 \end{pmatrix}$$

$$H_{F5} = \begin{pmatrix} 2 & 2 & 2 & 2 & 2 \\ 2 & -2 & 0 & -2 & 2 \\ 2 & 1 & 0 & -1 & -2 \\ 1 & 1 & -4 & 1 & 1 \\ 1 & -2 & 0 & 2 & -1 \end{pmatrix}, \quad \text{Equation 9}$$

$$H_{I5} = \begin{pmatrix} 1 & 1 & 2 & 1 & 1 \\ 1 & -1 & 1 & 1 & -2 \\ 1 & 0 & 0 & -4 & - \\ 1 & -1 & -1 & 1 & 2 \\ 1 & 1 & -2 & 1 & -1 \end{pmatrix}$$

where $H_{F3}$ and $H_{I3}$ represent the forward and inverse 3×3 transforms (e.g., for use with a nine pixel trace), $H_{F4}$ and $H_{I4}$ represent the forward and inverse 4×4 transforms (e.g., for use with a 16 pixel trace), and $H_{F5}$ and $H_{I5}$ represent the forward and inverse 5×5 transforms (e.g., for use with a 25 pixel trace). Those of ordinary skill in the art will readily recognize that the forward transform shown in Equation 7 is a special case of the generic transform shown in Equation 4 in which a=4, b=3, and c=5. Likewise, the forward transform shown in Equation 8 is a special case of the generic transform shown in Equation 5 in which a=4, b=5, and c=2. The forward transform shown in Equation 9 is a special case of the general transform shown in Equation 6 in which a=2, b=2, c=2, d=1, and e=1. The skilled artisan will also recognize that the inverse transform matrices shown in Equations 7-9 are simply scaled versions of the transpose matrices. For example, the first column in $H_{I3}$ (Equation 7) is scaled down by a factor of four, the second column by a factor of three, and the third column by a factor of five (as compared to the transpose matrix $H_{F3}{}^T$. The invention is of course not limited in this regard.

As stated above, advantageous transforms are configured such that the scaling factors are close to one another. The exemplary transform embodiment shown in Equation 7 has scaling factors of 48, 54, and 50 such that $H_{F3}H_{F3}{}^T$=diag[48, 54, 50]. The exemplary transform embodiment shown in Equation 8 has scaling factors of 64 and 58 such that $H_{F4}H_{F4}{}^T$=diag[64, 58, 64, 58]. The exemplary transform embodiment shown in Equation 9 has scaling factors of 20, 16, and 10 such that $H_{F5}H_{F5}{}^T$=diag[20, 16, 10, 20, 10].

The exemplary transforms embodiments shown in Equations 7-9 advantageously have a relatively small dynamic range expansion and are thus suitable for use with a conventional 16-bit digital signal processor (DSP). For example, the dynamic range expansion of $H_{F3}$ is 144 for a two-dimensional transform, which may be represented by 8 bits. The dynamic range expansion of $H_{F4}$ is 256 for a two-dimensional transform and 16 for a one-dimensional transform, which may be represented by 9 and 5 bits respectively. The dynamic range expansion of $H_{F5}$ is 100 for a two-dimensional transform, which may be represented by 7 bits. Accordingly, when using a 16-bit DSP, the dynamic range of the LWD source data may be as many as 8 bits for the 2-D $H_{F3}$, 7 bits for the 2-D $H_{F4}$, 11 bits for the 1-D $H_{F4}$, and 9 bits for the 2-D $H_{F5}$.

It will be appreciated by those of ordinary skill in the art that the invention is not limited to the generic and preferred transforms shown in Equations 4-6 and 7-9 respectively. Those of ordinary skill will readily recognize that these transforms may be expressed in numerous equivalent forms. For example, any two rows of the forward transform may be exchanged without changing the compression efficiency of the invention so long as the same rows are exchanged in the inverse transform. Moreover, any row (or rows) may be scaled without changing the compression efficiency of the invention. Such scaled row(s) result in scaled coefficients in Y (Equation 1), which can be compensated during quantization. For optimum compression efficiency, the DC component (the DC coefficient) of Y is the corresponding diagonal coefficient of the row in the transform in which each transform element has the same value (row 0 in the transforms shown in Equations 7-9). For example, in an exemplary embodiment in which row 0 is exchanged with row 2, the DC coefficient of Y will be the third element in row 2 (the element in the 2,2 position).

The exemplary embodiments described above with respect to Equations 1-9 are configured for LWD imaging applications in which the number of pixels per trace is a perfect square (e.g., 9, 16, 25, and so on). It will be appreciated that the invention is not limited in this regard and that the transform matrices shown in Equations 4-9 may also be utilized in a one-dimensional transformation. For imaging applications in which the number of pixels is not a perfect square, a suitable compression method in accordance with the invention may include a one-dimensional transformation. Moreover the source data from a single trace may be broken up into multiple blocks, each of which is compressed and transmitted to the surface. For example, a trace having 32 pixels may be divided into two blocks of 16, each of which may be reorganized into a 4×4 matrix and transformed as described above. Likewise a trace having 20 pixels may be divided into a first block having 16 pixels and a second block having 4 pixels. The first block may be reorganized into a 4×4 matrix and transformed as described above while the second block may be transformed using a one-dimensional transform.

The use of a one-dimensional transformation is now described in more detail. A one-dimensional transformation may be expressed mathematically, for example, as follows:

$$y = H_F x \quad \text{Equation 10}$$

where x represents a one-dimensional input vector (the pixilated trace), y represents the transformed trace (also referred to as the coefficients), and $H_F$ represents a suitable two-dimensional forward transform matrix. For example, for a trace having 8 pixels, $H_F$ includes an 8×8 transform matrix that may be designed using the same methodology as described in more detail below in TRANSFORMATION MATRIX DESIGN. A generic 8×8 transform matrix may have the following form:

$$H_{F8} = \begin{pmatrix} a & a & a & a & a & a & a & a \\ b & c & d & e & -e & -d & -c & -b \\ f & g & -g & -f & -f & -g & g & f \\ c & -e & -b & -d & d & b & e & -c \\ a & -a & -a & a & a & -a & -a & a \\ d & -b & e & c & -c & -e & b & -d \\ g & -f & f & -g & -g & f & -f & g \\ e & -d & c & -b & b & -c & d & -e \end{pmatrix},$$ Equation 11

$$\text{diag}[\bullet] = \begin{pmatrix} u^2 & 0 & 0 & 0 & 0 & 0 & 0 & 0 \\ 0 & v^2 & 0 & 0 & 0 & 0 & 0 & 0 \\ 0 & 0 & w^2 & 0 & 0 & 0 & 0 & 0 \\ 0 & 0 & 0 & v^2 & 0 & 0 & 0 & 0 \\ 0 & 0 & 0 & 0 & u^2 & 0 & 0 & 0 \\ 0 & 0 & 0 & 0 & 0 & v^2 & 0 & 0 \\ 0 & 0 & 0 & 0 & 0 & 0 & w^2 & 0 \\ 0 & 0 & 0 & 0 & 0 & 0 & 0 & v^2 \end{pmatrix}$$

where $H_{F8}$ represents the generic 8×8 forward transform matrix, a, b, c, d, e, f, and g represent positive rational numbers, and diag[•] represents a diagonal matrix having scaling factors $u^2$, $v^2$, and $w^2$ where $u^2=8a^2$, $v^2=2(b^2+c^2+d^2+e^2)$, and $w^2=4(f^2+g^2)$.

Taking into account the aforementioned preferences, a most preferred 8×8 matrix may be given as follows:

$$H_{F8} = H_{I8}^T =$$ Equation 12

$$\begin{pmatrix} 3.5 & 3.5 & 3.5 & 3.5 & 3.5 & 3.5 & 3.5 & 3.5 \\ 5 & 4.5 & 3 & 1 & -1 & -3 & -4.5 & -5 \\ 4.5 & 2 & -2 & -4.5 & -4.5 & -2 & 2 & 4.5 \\ 4.5 & -1 & -5 & -3 & 3 & 5 & 1 & -4.5 \\ 3.5 & -3.5 & -3.5 & 3.5 & 3.5 & -3.5 & -3.5 & 3.5 \\ 3 & -5 & 1 & 4.5 & -4.5 & -1 & 5 & -3 \\ 2 & -4.5 & 4.5 & -2 & -2 & 4.5 & -4.5 & 2 \\ 1 & -3 & 4.5 & -5 & 5 & -4.5 & 3 & -1 \end{pmatrix}$$

where $H_{F8}$ and $H_{I8}^T$ represent the forward transform matrix and the inverse transpose matrix where a=3.5, b=5, c=4.5, d=3, e=1, f=4.5, and g=2. The exemplary transform matrix shown in Equation 12 has scaling factors of 98, 110.5, and 97 such that $H_{F8}H_{F8}^T$=diag[98, 110.5, 97, 110.5, 98, 110.5, 97, 110.5] and may be used in either a one-dimensional transformation (for a trace having 8 pixels) or a two-dimensional transformation (for a trace having 64 pixels). The dynamic range expansion of $H_{F8}$ on one-dimensional data is 5 bits, which when using a 16 bit DSP allows for source data having a dynamic range of up to 11 bits.

With reference again to FIG. 3, the transformed coefficients (Y in Equation 1 or y in Equation 10) are typically quantized as shown at 308. One suitable quantization embodiment may be represented mathematically, for example, as follows:

$$Y_Q(i,j) = \text{sign}[Y(i,j)]\frac{|Y(i,j)|M(Q_m,i,j)+2^{(k-1+Q_e)}}{2^{(k+Q_e)}}$$ Equation 13 where Y(i,j) represent the individual coefficients of the matrix Y (at row i and column j in Y), $Y_Q(i,j)$ represent the individual quantized coefficients, $M(Q_m,i,j)$ represents a quantization scaling matrix which is described in more detail below, and $Q_e$ and $Q_m$ represent quantization parameters which are also described in more detail below.

The corresponding de-quantization matrix may be represented mathematically, for example, as follows:

$$Y_D(i,j)=Y_Q(i,j)S(Q_m,i,j)2^{Q_e}$$ Equation 14 where $Y_Q(i,j)$, $Q_e$ and $Q_m$ are as defined above with respect to Equation 8, $Y_D(i,j)$ represents the de-quantized coefficients, and $S(Q_m,i,j)$ represents a de-quantization scaling matrix as described in more detail below.

It will be appreciated that quantization and de-quantization of coefficients obtained from a one-dimensional transformation (e.g., from the one-dimensional transform shown in Equation 10), is identical to that shown in Equations 13 and 14 above with the exception that the two-dimensional matrices Y(i,j) $Y_Q(i,j)$, and $Y_D(i,j)$ are replaced with one-dimensional matrices Y(i), $Y_Q(i)$, and $Y_D(i)$. Two dimensional scaling matrices are still utilized in quantization and de-quantization as described in more detail below.

It will be appreciated that Equations 13 and 14 are configured for scalar quantization and de-quantization for independent, uniformly distributed coefficients. Those of ordinary skill will readily recognize that other mathematical formulas can be used for different distribution models (e.g., a generalized Gaussian distribution on DCT coefficients). Such other quantization and de-quantization formulas can be readily obtained by following the well known optimization process for scalar quantization (see, for example, Yun Q. Shi and Huifang Sun, *Image and Video Compression for Multimedia Engineering: Fundamentals, Algorithms, and Standards*, Chapter 2, CRC Press, 1999).

In one exemplary embodiment suitable for downhole applications, the quantization parameter is set to be within the range 0-31 (up to 5 bit), with a coarser quantization step size of 5 (the invention is not limited to any particular coarser quantization step size). The quantization parameters $Q_e$ and $Q_m$ may then be determined as follows: $Q_e=\lfloor Q_P/5 \rfloor$ and $Q_m=Q_P \%5$ where $Q_P$ represents an adjustable quantization parameter describe in more detail in CODER CONTROL, "$\lfloor \bullet \rfloor$" represents the mathematical flooring function such that $Q_P/5$ is truncated to an integer value (i.e., $Q_e$ equals the largest integer less than $Q_P/5$), and "%" represents the integer modulo operation. Those of ordinary skill will readily recognize that $Q_e$ is equal to the integer quotient of $Q_P/5$, while $Q_m$ is equal to the integer remainder. For example, when $Q_P=14$, then $Q_e=2$ and $Q_m=4$. The invention is, of course, no limited in these regards.

With continued reference to Equations 13 and 14 the M and S matrices may be advantageously configured to account for the scaling factors introduced during transformation. Given the dynamic source range (i.e., the dynamic range of the source data) a scaling number may be selected so that rounding errors on division are small. For example, in one exemplary LWD density imaging application, the source data has a 7-bit dynamic range. For this application, a scaling number of $2^z$ may be selected such that:

$$M(Q_m,r)S(Q_m,r)v(r) \approx 2^z$$ Equation 15 where v(r) represents the scaling factor. In the exemplary embodiments described below, z=21, 22, 23, or 24, however, it will be appreciated that other scaling numbers may be utilized, depending on the source data and the transformation matrices utilized. Quantization and de-quantization matrices M and S may then be determined. For example, the de-quantization matrix S may be selected based on various factors and the corresponding quantization matrix M calculated using Equation 15. In order to promote fine control on the output bit rate, the de-quantization factors in a particular column may be spread over an interval ranging from some starting value to twice that value. An optimization process which seeks to minimize distortion in the reconstructed image may be employed to select the interval starting points in the de-quantization matrix. Exemplary quantization and de-quantization matrices are depicted below in Equations 16-20 for the exemplary transformation matrices shown in Equations 7-9 and 12. The invention is in no way limited by these exemplary embodiments.

Exemplary quantization and de-quantization matrices M and S for use with a two-dimensional transform utilizing the 3×3 transformation matrix shown in Equation 7 may be given as follows:

$$M_3^2 = \begin{pmatrix} 12945 & 2725 & 6213 & 6472 & 8738 & 9320 \\ 10591 & 2251 & 5084 & 5178 & 7358 & 7767 \\ 8962 & 1917 & 4415 & 4568 & 6355 & 6657 \\ 7767 & 1670 & 3813 & 4088 & 5592 & 5825 \\ 7281 & 1479 & 3423 & 3698 & 4821 & 5178 \end{pmatrix},$$

$$S_3^2 = \begin{pmatrix} 9 & 19 & 27 & 12 & 16 & 10 \\ 11 & 23 & 33 & 15 & 19 & 12 \\ 13 & 27 & 38 & 17 & 22 & 14 \\ 15 & 31 & 44 & 19 & 25 & 16 \\ 16 & 35 & 49 & 21 & 29 & 18 \end{pmatrix}$$

Equation 16 where $M_3^2$ and $S_3^2$ represent the quantization and de-quantization scaling matrices respectively. These scaling matrices were obtained using a scaling number of $2^{21}$ in Equation 15. In the exemplary embodiment shown, a first group of coefficients Y(0,0) has a scaling factor of 144. A second group Y(1,1) has a scaling factor of 324. A third group Y(2,2) has a scaling factor of 100. A fourth group Y(0,1) and Y(1,0) has a scaling factor of 216. A fifth group Y(1,2) and Y(2,1) has a scaling factor of 180. A sixth group Y(0,2) and Y(2,0) has a scaling factor of 120. Thus, both $M_3^2$ and $S_3^2$ have 6 columns.

Exemplary quantization and de-quantization matrices for use with a one-dimensional transform utilizing the 4×4 transformation matrix shown in Equation 8 may be given as follows:

$$M_4^1 = \begin{pmatrix} 2521 & 2009 \\ 2048 & 1722 \\ 1725 & 1507 \\ 1490 & 1291 \\ 1365 & 1130 \end{pmatrix}, S_4^1 = \begin{pmatrix} 13 & 18 \\ 16 & 21 \\ 19 & 24 \\ 22 & 28 \\ 24 & 32 \end{pmatrix}$$

Equation 17 where $M_4^1$ and $S_4^1$ represent the quantization and de-quantization scaling matrices respectively. These scaling matrices were obtained using a scaling number of $2^{21}$ in Equation 15. In the exemplary embodiment shown, a first group of coefficients Y(0,0) and Y(0,2) (i.e., the first element in the coefficient vector) has a scaling factor of 16. A second group Y(0,1) and Y(0,3) has a scaling factor of 29. Thus, both $M_4^1$ and $S_4^1$ have 2 columns.

Exemplary quantization and de-quantization matrices for use with a two-dimensional transform utilizing the 4×4 transformation matrix shown in Equation 8 may be given as follows:

$$M_4^2 = \begin{pmatrix} 2048 & 831 & 904 \\ 1725 & 665 & 753 \\ 1489 & 587 & 646 \\ 1260 & 525 & 565 \\ 1130 & 475 & 502 \end{pmatrix}, S_4^2 = \begin{pmatrix} 16 & 12 & 20 \\ 19 & 15 & 24 \\ 22 & 17 & 28 \\ 26 & 19 & 32 \\ 29 & 21 & 36 \end{pmatrix}$$

Equation 18 where $M_4^2$ and $S_4^2$ represent the quantization and de-quantization scaling matrices respectively. These scaling matrices were obtained using a scaling number of $2^{23}$ in Equation 15. In the exemplary embodiment shown, a first group of coefficients Y(0,0), Y(0,2), Y(2,0), and Y(2,2) has a scaling factor of 256. A second group of coefficients Y(1,1), Y(1,3), Y(3,1), and Y(3,3) has a scaling factor of 841. A third group (the remainder of the coefficients) has a scaling factor of 464. Thus both $M_4^2$ and $S_4^2$ have 3 columns.

Exemplary quantization and de-quantization matrices for use with a two-dimensional transform utilizing the 5×5 transformation matrix shown in Equation 9 may be given as follows:

$$M_5^2 = \begin{pmatrix} 29127 & 20971 & 13981 & 20971 & 4415 & 1997 \\ 23831 & 17476 & 11983 & 17476 & 3813 & 1677 \\ 20164 & 14979 & 9868 & 14979 & 3226 & 1446 \\ 17476 & 13107 & 8830 & 13107 & 2796 & 1233 \\ 16384 & 11650 & 7989 & 11650 & 2467 & 1103 \end{pmatrix},$$

$$S_5^2 = \begin{pmatrix} 9 & 10 & 12 & 5 & 19 & 21 \\ 11 & 12 & 15 & 6 & 22 & 25 \\ 13 & 14 & 17 & 7 & 26 & 29 \\ 15 & 16 & 19 & 8 & 30 & 34 \\ 16 & 18 & 21 & 9 & 34 & 38 \end{pmatrix}$$

Equation 19 where $M_5^2$ and $S_5^2$ represent the quantization and de-quantization scaling matrices respectively. These scaling matrices were obtained using a scaling number of $2^{24}$ in Equation 15. In the exemplary embodiment shown, a first group of coefficients Y(0,0), Y(0,2), Y(0,4), Y(2,0), Y(2,2), Y(2,4), Y(4,0), Y(4,2), and Y(4,4) has a scaling factor of 100. A second group Y(0,1), Y(1,0), Y(1,2), Y(1,4), Y(2,1), and Y(4,1) has a scaling factor of 80. A third group Y(0,3), Y(2,3), Y(3,0), Y(3,2), Y(3,4), and Y(4,3) has a scaling factor of 200. A fourth group Y(1,1) has a scaling factor of 64. A fifth group Y(1,3) and Y(3,1) has a scaling factor of 160. A sixth group Y(3,3) has a scaling factor of 400. Thus, both $M_5^2$ and $S_5^2$ have 6 columns.

Exemplary quantization and de-quantization matrices for use with a one-dimensional transform utilizing the 8×8 transformation matrix shown in Equation 127 may be given as follows:

$$M_8^1 = \begin{pmatrix} 2048 & 831 & 904 \\ 1725 & 665 & 753 \\ 1489 & 587 & 646 \\ 1260 & 525 & 565 \\ 1130 & 475 & 502 \end{pmatrix}, S_8^1 = \begin{pmatrix} 16 & 12 & 20 \\ 19 & 15 & 24 \\ 22 & 17 & 28 \\ 26 & 19 & 32 \\ 29 & 21 & 36 \end{pmatrix} \quad \text{Equation 20}$$

where $M_8^1$ and $S_8^1$ represent the quantization and de-quantization scaling matrices respectively. These scaling matrices were obtained using a scaling number of $2^{22}$ in Equation 15. In the exemplary embodiment shown, a first group of coefficients Y(0,0) and Y(0,5) has a scaling factor of 98. A second group Y(0,1), Y(0,3), Y(0,5), and Y(0,5) has a scaling factor of 110.5. A third group Y(0,3) and Y(0,6) has a scaling factor of 97. Thus, both $M_8^1$ and $S_8^1$ have 3 columns.

It will be appreciated that the quantization and de-quantization matrices shown above in Equations 16-20 each include 5 rows due to the selection of a coarser quantization step size of 5. It will be understood that the invention is not limited in these regards. Moreover, it will be appreciated that the scaling number ($2^z$ in Equation 15) is coupled with k in Equation 13 as well as with the coarser quantization step size of 5 such that k+5=z. It will be further appreciated that since the transform scaling factors are taken into account during quantization, the transform 306 and quantization 308 steps may be thought of as a single step as shown at 310. The invention is, of course, not limited in these regards.

It should be noted that the exemplary quantization and de-quantization processes described above advantageously do not include any division steps. Moreover, the computations, including all intermediate values, advantageously fall within 32 bit range, with Y, Y', and $Y_Q$ being within 16 bit range.

During de-coding (for example at step 316 in FIG. 3 or step 404 in FIG. 4), an inverse transform step follows the de-quantization of the quantized coefficients (Equation 9). The inverse transform step (for a two-dimensional transformation) may be represented mathematically, for example, as follows (where $X_R$ represents the matrix of reconstructed pixels, i.e., the reconstructed trace):

$$X_R = H_I(Y_D H_I^T) \quad \text{Equation 21}$$

The final reconstructed trace may be obtained, for example, by performing the following sign shift operation:

$$X_R(i, j) = \frac{(X_R(i, j) + 16)}{32} \quad \text{Equation 22}$$

The division by 32 (via a sign extended right shift by 5) is due to the fact that the scaling number ($2^z$) in Equation 15 holds for all paired elements of M and S at the same (i,j) coordinates. Those of ordinary skill will readily recognize that an inverse transform may be expressed as $x_R = H_I y_D$ for a one-dimensional transformation.

Equations 1 through 22 describe one exemplary compression methodology in accordance with the invention in which a single pixilated trace (represented by the two-dimensional matrix X or the one dimensional matrix x) may be compressed and reconstructed. In other exemplary embodiments, a difference between sequential traces may be compressed and transmitted to the surface. The difference between sequential traces is referred to herein as a residual. FIG. 3 illustrates one such embodiment in which the residuals are determined at 304 and compressed at 310. Compression of trace residuals is described in more detail below in PREDICTION AND DOWNHOLE DECODING.

Multiple Trace Transformation

Exemplary embodiments of the invention may also compress multiple traces of sensor data simultaneously to optimize compression efficiency. It will be appreciated that there is a trade-off between achieving optimum compression efficiency on the one hand (which is typically achieved when larger data blocks are compressed) and minimal latency on the other hand. In embodiments in which sensor data is compressed and transmitted trace by trace, minimal latency is generally achieved. In some applications it may be desirable to relax the latency requirement somewhat so that greater compression efficiency may be achieved. For example, in one exemplary embodiment it may be desirable to re-organize sensor data from first and second traces into a single square matrix. This may be achieved, for example, by arranging two traces, each having 8 pixels, into a single 4×4 matrix. The 4×4 matrix of sensor data may then be processed as described above in JOINT TRANSFORM AND QUANTIZATION. In another embodiment, three traces, each including 12 pixels, may be reorganized into a single 6×6 matrix which may then be transformed and quantized as described above. Likewise, four traces, each including 9 and 16 pixels, may be reorganized into 6×6 and 8×8 matrices, respectively. In such embodiments, the number of traces combined into a single matrix is preferably less than the size of the square matrix. In this way a suitable balance between latency and compression efficiency may typically be achieved.

In certain applications it may also be desirable to reorganize the source data from multiple traces into two or more matrices. For example, three traces, each including 24 pixels, may be combined into first and second 6×6 matrices. Again, in order to strike a suitable balance between latency and compression efficiency, the number of traces is preferably less than the size of one of the square matrices.

Entropy Coding

With reference again to FIG. 3, the quantized coefficients (e.g., obtained from Equation 8) are entropy encoded at 312 and then transmitted to the surface. Owing to both (i) the severe bandwidth limitations of conventional mud pulse telemetry techniques and (ii) the desirability of reducing latency, the entropy coding process typically encodes relatively few quantized coefficients. In order to achieve entropy encoding, transmission, and decoding, a prefix free, variable length coding (VLC) method with an embedded universal coded is employed. It will be appreciated, however, that the invention is not limited to any particular entropy encoding technique.

With reference now to TABLE 1, one exemplary entropy encoding process suitable for use in LWD imaging applications is shown. The exemplary embodiment shown is configured for a 4×4 matrix of quantized coefficients. Of course, the invention is not limited in this regard. During the encoding process, the 4×4 matrix of quantized coefficients is encoded quadrant by quadrant, beginning with the upper left-hand quadrant and ending with the lower right-hand quadrant. The exemplary encoding process described herein includes the following three steps: (i) coefficient pattern recognition, (ii) encoding of the pattern, and (iii) encoding of the coefficients. This process is described below for a single quadrant, however it will be appreciated that the process is repeated for each quadrant in the matrix.

TABLE 1

| | | |
|---|---|---|
| $A_0$ | $\begin{pmatrix} 0 & 0 \\ 0 & 0 \end{pmatrix}$ | 1 |
| $A_1$ | $\begin{pmatrix} 1 & 0 \\ 1 & 0 \end{pmatrix}$ | 010 |
| $A_2$ | $\begin{pmatrix} 1 & 0 \\ 0 & 0 \end{pmatrix}$ | 011 |
| $A_3$ | $\begin{pmatrix} 1 & 0 \\ 1 & 1 \end{pmatrix}$ | 00011 |
| $A_4$ | $\begin{pmatrix} 1 & 1 \\ 1 & 0 \end{pmatrix}$ | 00000 |
| $A_5$ | $\begin{pmatrix} 1 & 1 \\ 0 & 1 \end{pmatrix}$ | 00001 |
| $A_6$ | $\begin{pmatrix} 1 & 1 \\ 1 & 1 \end{pmatrix}$ | 00010 |
| $A_7$ | All Other | 011 + Matrix |

The general design principle, as is known to those of skill in the art, is that patterns with a high probability of occurrence are encoded with fewer bits, while those with a lower probably of occurrence are encoded with more bits. With continued reference to TABLE 1, seven exemplary quadrant patterns are shown at $A_0$ through $A_6$. In these patterns, a 0 represents a quantized coefficient having a value of 0, while a 1 represents a quantized coefficient having a non-zero value. Due to the high degree of compression required in LWD imaging applications, the most likely occurrence is typically a quadrant having four zero valued coefficients as shown at $A_0$ (the transmission of residuals as described above also promotes the occurrence of quadrants having four zero-valued coefficients). Thus, this occurrence is encoded with a single bit. The patterns shown at $A_1$ and $A_2$ are typically the next most likely and are encoded with three bits each (010 and 011 respectively). The patterns shown at $A_3$ through $A_6$ have a relatively low probability of occurrence and are encoded with five bits each (00011, 00000, 00001, and 00010 respectively). All remaining patterns, which are the least likely to occur, are lumped together at $A_7$. These patterns are encoded using seven bits (011abcd where the pattern is represented by the following matrix:

$$\begin{pmatrix} a & b \\ c & d \end{pmatrix}).$$

It will be appreciated that the invention is not limited to any particular probabilities or pattern encoding. While certain patterns have been observed to have the greatest probabilities in LWD imaging applications, it is anticipated that the particular encoding scheme may be changed (even within a single drilling operation) depending upon the nature of the acquired image data. It will also be appreciated that the invention is not limited to the use of pattern encoding. For example, each quadrant may simply be encoded using four bits (abcd).

After pattern encoding, the non-zero coefficients are encoded (with the exception of the $A_0$ pattern that does not include any non-zero coefficients). In one exemplary embodiment, conventional Huffman encoding is utilized to encode coefficient values in the range from 1 to 6. Coefficients having a value of greater than or equal to 7 may be encoded using conventional Fibonacci code. The use of Fibonacci code advantageously aids in the identification of telemetry transmission errors. Since Fibonacci code is terminated by two consecutive 1's, a zero indicates the continuation of the current coefficient. A bit error (or close by scattered errors) only affects, at most, two symbols, one of which is the lost symbol and the other of which is corrupted. These types of scenarios are almost always detectable. Since relatively large coefficients are most probably the DC coefficient, bit errors will most likely only affect the smaller (AC) coefficients which carry less information.

It will be appreciated that a similar entropy encoding process may be utilized for other transform matrix sizes. For example, for a 3×3 matrix of quantized coefficients, the DC coefficient may be removed from the matrix and directly coded (e.g., via Huffman or Fibonacci code as described above). The remaining eight elements may be grouped into two 2×2 matrices and encoded as described above with respect to Table 1. Encoding a 5×5 matrix is similar in that the DC coefficient may be removed and directly encoded. The remaining 24 elements may be grouped into six 2×2 matrices and encoded as describe above with respect to Table 1.

Entropy decoding is performed at the surface as shown at 402 on FIG. 4. In one exemplary embodiment the entropy decoding process includes a VLC lookup table which matches both the code and the code length. The entropy decoding process 402 outputs the quantized coefficients for de-quantization and inverse transform at 404 and 406. It will be appreciated that the entropy decoding is not typically performed by the downhole decoder since the entropy coding process is lossless.

Prediction and Downhole Decoding

With reference again to FIGS. 3 and 4, the quantized coefficients may be decoded both uphole and downhole using substantially identical algorithms. One exemplary de-quantization process is described above with respect to Equation 9, while an exemplary inverse transform is described above with respect to Equations 7, 12, and 13.

FIG. 3 depicts a differential encoding methodology (in which the difference between first and second pixilated traces is encoded rather than the absolute values of the pixilated traces). In a typical scheme, the absolute value of a first pixilated trace may be encoded and transmitted to the surface. Instead of encoding the absolute value of the second pixilated trace, the difference between the second and first traces may be encoded and transmitted. Then the difference between the third and second traces is encoded and transmitted. And so on. It will be appreciated that at some interval (e.g., every k traces) the absolute value of a pixilated trace is encoded and transmitted to reduce compounding errors introduced, for example, during transmission.

Referring again to FIG. 3, the quantized coefficients are de-quantized and inverse transformed downhole at 316 to re-construct residuals from the current pixilated trace. These residuals are then combined with the previous trace to acquire a re-construction of the current pixilated trace. This reconstructed trace is utilized at 318 as a predictor for the next pixilated trace. Substantially any prediction algorithm may be used. In one exemplary embodiment the predictor (reconstructed trace described above) is subtracted from the pixilated trace newly acquired at 302, for example, as follows:

$$X'_{m+1} = X_{m+1} - X_{R,m} \qquad \text{Equation 23}$$

where $X'_{m+1}$ represents the residuals for trace number m+1, $X_{m+1}$ represents trace number m+1, and $X_{R,m}$ represents the reconstructed trace number m. The reconstructed trace $X_{R,m}$ may be readily obtained from the residuals upon surface decoding, for example, as follows:

$$X_{R,m}=X'_{R,m}+X_{R,m-1} \qquad \text{Equation 24}$$

where $X'_{R,m}$ represents the reconstructed residuals for trace number m and $X_{R,m-1}$ represents the reconstructed trace number m−1.

The resulting residuals X' may then be transformed and quantized, for example, as described above in JOINT TRANSFORM AND QUANTIZATION. It will be appreciated that the matrices X and $X_R$ (representing the pixilated trace and the reconstructed trace) in Equations 1, 21, and 22 may be replaced by X' and $X'_R$ (which represent the residuals and reconstructed residuals respectively). It will also be appreciated by those of ordinary skill that in embodiments in which residuals are compressed and transmitted Y, $Y_Q$, and $Y_D$ (in Equations 1, 13, 14, and 21) represent the coefficients, quantized coefficients, and de-quantized coefficients of the residuals. Such compression and transmission of residuals is often advantageous in that it tends to enable improved compression efficiency, especially in drilling operations in which there is minimal change in the LWD imaging data from one trace to the next.

Azimuthal Partitioning and Prediction

Figure 7:
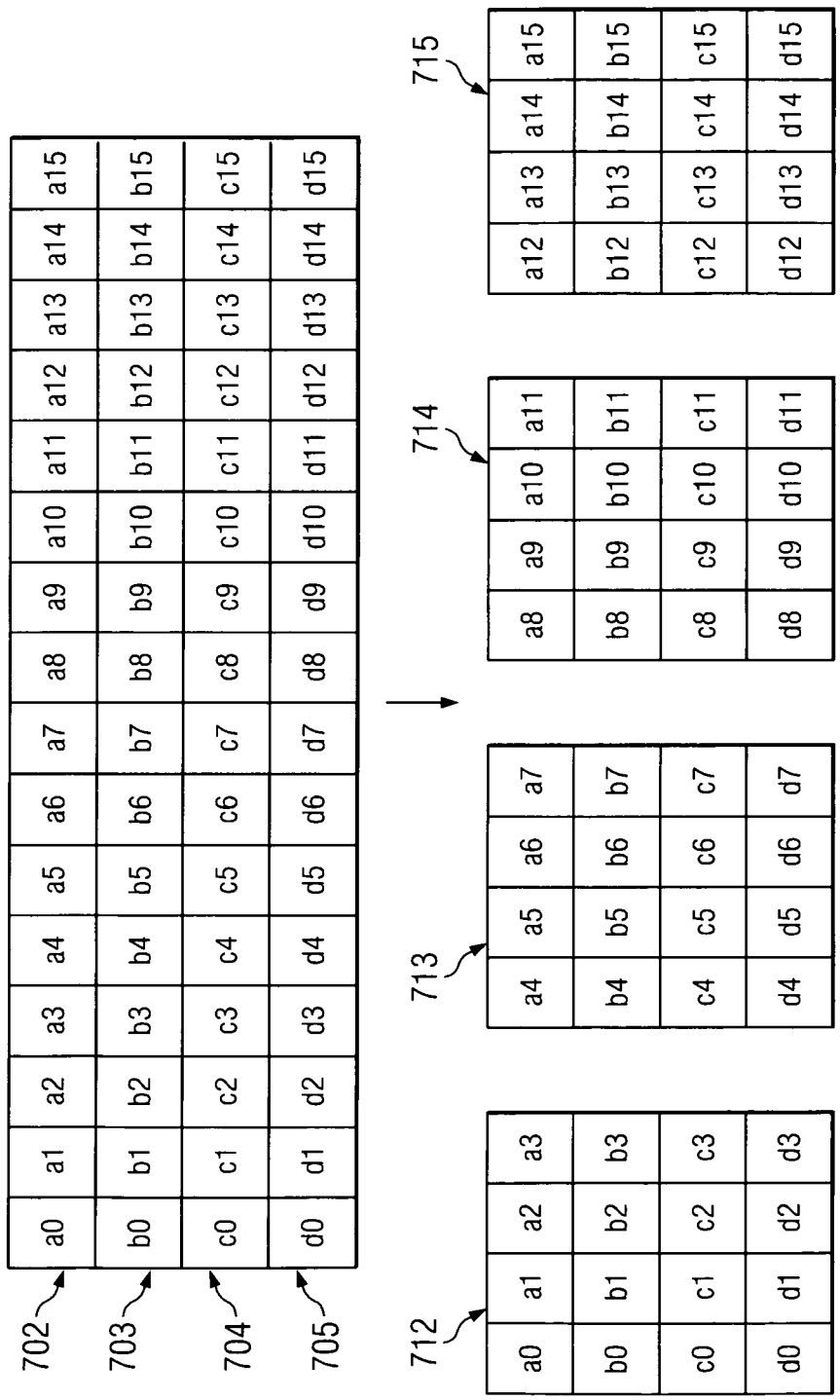
FIG. 7 depicts one exemplary azimuthal partitioning scheme in accordance with the present invention.

With reference now to FIG. 7, it may be advantageous in certain embodiments to azimuthally partition the sensor data prior to determining residuals. One exemplary embodiment of such azimuthal partitioning is shown on FIG. 7 (the invention is of course not limited by this embodiment). In the exemplary embodiment shown, four 16-pixel traces 702, 703, 704, and 705 may be azimuthally partitioned into four two-dimensional 4×4 matrices 712, 713, 714, and 715. As shown, each 4×4 matrix includes sensor data from one quadrant (including four pixels from each of the four traces in the exemplary embodiment shown).

With continued reference to FIG. 7, the sensor data in matrices 712, 713, 714, and 715 may then be transformed and quantized, for example, matrix by matrix as described above in JOINT TRANSFORMATION AND QUANTIZATION. It will be appreciated that such an embodiment advantageously enables the sensor data from one of the matrices 712, 713, 714, and 715 to be utilized as a predictor for the sensor data in the remaining matrices. Thus, for example, the absolute value of the sensor data in matrix 712 may first be compressed and transmitted to the surface. Instead of encoding the absolute values of the sensor data in matrix 713, the difference between matrix 713 and 712 may be encoded and transmitted. Likewise the differences between matrices 714 and 715 and matrix 712 may also be encoded and transmitted.

As described above in PREDICTION AND DOWNHOLE DECODING (and shown on FIG. 3), the quantized coefficients (from matrix 712) are de-quantized and inverse transformed downhole at 316 to re-construct the sensor data (to reconstruct matrix 712 in the exemplary embodiment under discussion). This sensor data is then subtracted from matrices 713, 714, and 715 to acquire residual matrices for encoding and transmitting uphole.

It will be appreciated that the use of azimuthal partitioning tends to advantageously enhance the compression efficiency in applications in which the azimuthal variation in the sensor data is low. In such instances, the residual matrices (e.g., matrices 713, 714, and 715) are near zero. As described above in MULTIPLE TRACE TRANSFORMATION, it is also typically desirable to simultaneously compress as few traces as possible in order to achieve minimal latency. As also described above, there tend to be trade-offs between achieving optimum compression efficiency and latency. In order to strike a suitable balance between latency and compression efficiency in exemplary embodiments of this invention, the number of traces is typically less than or equal to the size of one of the square matrices (in FIG. 7 the number of traces equals the size of the square matrices).

Coder Control

As described above, coder control may be employed to maintain the output bit stream at a substantially constant rate (e.g., an approximately constant number of bits per pixilated trace). Since (in the absence of coder control) the above described encoding process tends to generate a varying number of bits per pixilated trace, the use of a coder control scheme may be advantageously utilized to provide an approximately constant rate bit stream to the telemetry module.

With reference again to FIG. 3, coder control block 314 is configured to receive a bit count from the entropy coding block 312. Based on the bit count, the coder control either approves the bit stream for transmission or adjusts a quantization parameter from re-quantization of the coefficients. For example, if the encoded trace includes too many bits, the coder control block 314 may increase the quantization parameter $Q_P$ prior to re-quantization.

Figure 6A:
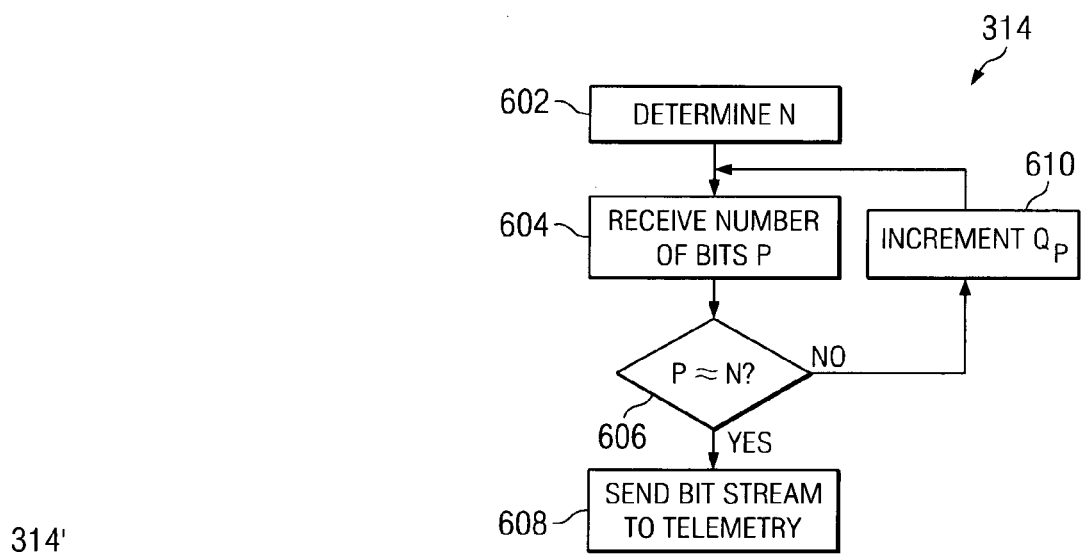
FIGS. 6A and 6B depict exemplary coder control embodiments in accordance with the present invention.
Figure 6B:
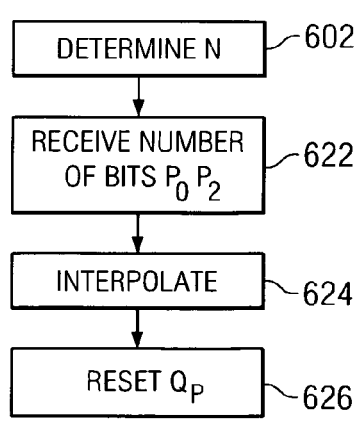

With reference now to FIGS. 6A and 6B, first and second exemplary coder control embodiments 314 and 314' are depicted in flow chart form. Both exemplary embodiments make use of a coded image buffer (CIB) deployed between entropy coder 312 (FIG. 3) and the telemetry system. The CIB receives the bit stream from the entropy coder and feeds a substantially constant rate bit stream to the telemetry system. Coder control embodiments 314 and 314' (FIGS. 6A and 6B) provide feedback to the quantization step 308 based on the fullness of the buffer (with respect to a target fullness). It will be appreciated that the target fullness of the CIB is generally application specific. For example, for a neutron density imaging application having 16 pixels per pixilated trace with a 1 bit/second transmission rate and a 0.25 foot per minute drilling rate (ROP), the maximum target fullness should be less than 40 bits to maintain latency at less than 40 seconds.

In the exemplary coder control embodiments shown on FIGS. 6A and 6B, coder control 314 and 314' first determine a target number of bits n to be sent to the CIB for a given pixilated trace (at 602). This determination may be made mathematically, for example, as follows:

$$n=\omega(F_T-F_C)+\gamma TR \qquad \text{Equation 25}$$

where $F_T$ represents a target CIB fullness, $F_C$ represents a current CIB fullness, T represents a time duration for acquiring a single trace of data, R represents an allocated data transmission rate for the telemetry system, and ω and γ represent adjustable parameters which may, for example, be set equal to 1.

When using the exemplary coder control embodiment 314 shown on FIG. 6A, the quantized coefficients are typically calculated at 308 (FIG. 3) using a middle of the range quantization parameter $Q_P$. After entropy encoding at 312, the encoded trace includes a certain number of bits p which is received at 604 and compared to the target number of bits n at 606. If p is approximately equal to n (i.e., within a predetermined threshold), then the encoded bit stream is sent to the CIB at 608 for transmission to the surface. If p is not equal to n (i.e., the absolute value of the difference is greater than the predetermined threshold), then the quantization parameter $Q_P$ is incremented upwards or downwards at 610 and the coefficients are re-quantized using the new $Q_P$. For the exemplary quantization embodiment described above, $Q_P$ is incremented upwards (to a greater value) when p is greater than n. When p is less than n, $Q_P$ is incremented downwards. This process of making incremental changes to $Q_P$ may be repeated as many times as necessary (provided the downhole tool has sufficient processing power) until a $Q_P$ is found that results in p being approximately equal to n.

When using the coder control embodiment 314' shown on FIG. 6B, the quantized coefficients are typically calculated at 308 (FIG. 3) using both lower and upper values of the quantization parameter $Q_P$ (the lower and upper values are designated as $Q_{P0}$ and $Q_{P2}$). After entropy encoding at 312, the encoded trace includes first and second bit streams, the first including a certain number of bits $p_0$ obtained with quantization parameter $Q_{P0}$ and the second including a certain number of bits $p_2$ obtained with the quantization parameter $Q_{P2}$. These are received at 622 and used to interpolate (at 624) an intermediate quantization parameter $Q_{P1}$ which is selected to result in a bit stream having a number of bits $p_1$ approximately equal to n. $Q_{P1}$ is then used to re-quantize the coefficients which are then sent to the telemetry system after entropy encoding.

Coder control embodiment 314' advantageously makes use of an inverse linear relationship between the quantization parameter $Q_P$ and bit rate. Such an inverse relationship has been previously identified (Z. He and S. Mitra, *A Unified Rate-Distortion Analysis Framework for Transform Coding*, IEEE Trans. On Circuits and Systems for Video Technology, Vol 11, no. 2, pp. 1221-1236, December 2001). It will be appreciated that coder control embodiment 314' may sometimes preserve downhole processor time as compared to embodiment 314 in that it requires a maximum of only three quantization and entropy encoding steps. Therefore, coder control embodiment 314' may be preferred in certain logging operations, for example, those having higher telemetry rates (e.g., 5-20 bits/second).

Transformation Matrix Design

As described above, a single trace of LWD sensor data includes a plurality of measured values (referred to above as pixels) distributed about a circular horizon. As also described above, these pixels may be arranged in either a one- or two-dimensional matrix. In one-dimension, the sensor measurements may be thought of as an ensemble of random variables $x=\{x_0, x_1, \ldots, x_{n-1}\}$ where n represents the number of unique sensor measurements (e.g., the number of pixels in a trace although the invention is not limited to a single trace of sensor data). A covariance matrix C(i,j) for the ensemble of random variables may represented mathematically, for example, as follows:

$$C(i,j)=E(x_i,x_j)=E(x_i-E(x_i))(x_j-E(x_j)) \quad \text{Equation 26}$$

where $E(x_i,x_j)$ represents the covariance of sensor measurements $x_i$ and $x_j$ and where the covariance matrix C is real and symmetric. It will be appreciated by those of skill in the mathematical arts that the sensor measurements represent a data sample rather than a full ensemble of random variables and that as a result the covariance matrix C is a sampled covariance matrix.

It is well known that the covariance matrix C has n real eigenvalues up to their orders. The corresponding eigenvectors for these eigenvalues may be represented as $v_0, v_1, \ldots, v_{n-1}$. The eigenvectors may then be used to form a two-dimensional matrix T whose i-th row is $v_i$ (i.e., T is the transpose of the matrix $(v_0, v_1, \ldots, v_{n-1})$). When constructed in this way, the matrix T is a Karhünen-Loève Transform (KLT). A KLT transform is commonly defined as an orthogonal matrix (i.e., T times its transpose equals the identity matrix) for which $TCT^T$ equals a diagonal matrix (Goyal, "*Theoretical Foundations for Transform Coding*", IEEE Signal Processing Magazine, 18:9-21, September 2001). In embodiments of the invention in which a KLT is utilized, the matrix T may be utilized as the transformation matrix. In preferred embodiments of this invention, the matrix T is truncated to a fixed point matrix (e.g., such that it includes integer matrix elements). After truncation, matrix T is typically no longer orthogonal, nor does $TCT^T$ generally equal a diagonal matrix. Hence the fixed point transform matrices utilized in exemplary embodiments of the invention are referred to herein as KL-like.

It will be appreciated that the transform matrix T depends on the sensor measurements x (e.g., the sensor measurements in one or more traces of sensor data) and in particular the distribution of the sensor measurements. Therefore, it will further be appreciated, that the transform matrix T may be configured to provide optimal compression for a particular distribution of source data. As such, in one exemplary embodiment of the invention, an optimum transform matrix T may be determined downhole based on the covariance of the source data. While such an approach may provide for optimum data compression, it can also result in excessive overhead (depending on the bandwidth of the telemetry system) in that the matrix elements must be transmitted to the surface along with the compressed data. While there can be significant advantages to using an optimized transform, in downhole applications where telemetry bandwidth is often severely limited, minimizing overhead is also of importance.

It has been found that a typical trace of sensor data may be effectively simplified using an autoregressive model. It is believed that this is due at least in part to the above described circular correlation inherent in a trace of sensor data. Since a typical trace includes a relatively small number of azimuthal pixels, a first-order, zero-pole autoregressive model may be utilized to simplify the data dependency of the KLT. In one exemplary embodiment, two coefficients, denoted by $\alpha$ and $\beta$, may be computed for a given trace (or plurality of traces) using the Levinson-Durbin algorithm whose recursive version may, in general, solve the problem in time on a quadratic order of the number of predictor coefficients (Makhoul, "*Linear Prediction: A Tutorial Review, Proceedings of the IEEE*, 63(4): 561-580, April 1975). The covariance matrix C may then be formulated for the following exemplary embodiments including 9 pixels, 16 pixels, and 25 pixels such that:

$$C_3 = \begin{pmatrix} 1 & e_1 & e_2 \\ e_1 & 1 & e_1 \\ e_2 & e_1 & 1 \end{pmatrix} \quad \text{Equation 27}$$

$$C_4 = \begin{pmatrix} 1 & e_1 & e_2 & e_3 \\ e_1 & 1 & e_1 & e_2 \\ e_2 & e_1 & 1 & e_1 \\ e_3 & e_2 & e_1 & 1 \end{pmatrix} \quad \text{Equation 28}$$

$$C_5 = \begin{pmatrix} 1 & e_1 & e_2 & e_3 & e_4 \\ e_1 & 1 & e_1 & e_2 & e_3 \\ e_2 & e_1 & 1 & e_1 & e_2 \\ e_3 & e_2 & e_1 & 1 & e_1 \\ e_4 & e_3 & e_2 & e_1 & 1 \end{pmatrix} \quad \text{Equation 29}$$

where $C_3$, $C_4$, and $C_5$ represent 3×3, 4×4, and 5×5 covariance matrices, $e_1 = \alpha + \beta$, $e_2 = \alpha + \beta e_1$, $e_3 = \alpha e_1 + \beta e_2$, $e_4 = \alpha e_2 + \beta e_3$, $\alpha$ represents a mathematical correlation between nearest neighbor pixels (e.g., between pixels $x_0$ and $x_1$) and $\beta$ represents a mathematical correlation between second nearest neighbor pixels (e.g., between pixels $x_0$ and $x_2$).

A divide and conquer algorithm may be used to solve for the eigenvalues of $C_3$, $C_4$, and $C_5$. The solution for the eigenvalues of $C_5$ is described in more detail below. Those of ordinary skill will readily recognize that the eigenvalues of $C_3$ and $C_4$ may be determined using a similar approach. The householder transform is first applied to $C_5$ to obtain a tri-diagonal matrix which has identical eigenvalues to $C_5$. The tri-diagonal matrix may then be partitioned into two small matrices, for example, a 2×2 matrix and a 3×3 matrix as shown below:

$$\begin{pmatrix} \gamma_1 & \varepsilon_2 & 0 & 0 & 0 \\ \varepsilon_2 & \gamma_2 & \varepsilon_3 & 0 & 0 \\ 0 & \varepsilon_3 & \gamma_3 & \varepsilon_4 & 0 \\ 0 & 0 & \varepsilon_4 & \gamma_4 & \varepsilon_5 \\ 0 & 0 & 0 & \varepsilon_5 & \gamma_5 \end{pmatrix} =$$

$$\begin{pmatrix} \gamma_1 & \varepsilon_2 & 0 & 0 & 0 \\ \varepsilon_2 & \gamma_2 - \varepsilon_3 & 0 & 0 & 0 \\ 0 & 0 & \gamma_3 - \varepsilon_3 & \varepsilon_4 & 0 \\ 0 & 0 & \varepsilon_4 & \gamma_4 & \varepsilon_5 \\ 0 & 0 & 0 & \varepsilon_5 & \gamma_5 \end{pmatrix} + \begin{pmatrix} 0 & 0 & 0 & 0 & 0 \\ 0 & \varepsilon_3 & \varepsilon_3 & 0 & 0 \\ 0 & \varepsilon_3 & \varepsilon_3 & 0 & 0 \\ 0 & 0 & 0 & 0 & 0 \\ 0 & 0 & 0 & 0 & 0 \end{pmatrix}$$

where the above referenced tri-diagonal matrix is on the left side of the equation and the partitioned matrix is on the right side of the equation, and $\gamma_1$, $\gamma_2$, $\gamma_3$, $\gamma_4$, $\gamma_5$, $\in_2$, $\in_3$, $\in_4$, and $\in_5$ are functions of $\alpha$ and $\beta$. The 3×3 matrix eigenvalues may be solved by a further partition to a 1×1 (a scalar whose eigenvalue is itself) and a 2×2 matrix. The eigenvalues of the 2×2 matrices may be determined using the well known quadratic equation. Once the eigenvalues of the partitioned matrices have been obtained, a numerical root-solving algorithm may be utilized to determine the actual eigenvalues of the tri-diagonal matrix (and therefore of the original covariance matrix C. For the divide and conquer type eigenvalue solver, a specific root solver is preferred that ensures a stable, fast numerical convergence. The preferred root solver may be expressed mathematically as follows:

$$f(x) = 1 + \rho \sum_{i=0}^{n-1} \frac{\varsigma_i^2}{\delta_i - x} \quad \text{Equation 30}$$

where $\delta_i$ represents the eigenvalues of the smaller matrices derived during partitioning of the tri-diagonal matrix, $\rho$ represents the diagonal element at a given partition position of the tri-diagonal matrix, and $\varsigma_i$ are derived from the eigenvectors of the two small matrices obtained from the divide and conquer algorithm. The roots to $f(x)=0$ are the eigenvalues of the covariance matrix C with $\delta_i$ separating consecutive eigenvalues. In other words between $\delta_i$ and $\delta_{i+1}$ there exists exactly one eigenvalue of M. It will be appreciated that the above described algorithm requires that $\alpha + \beta \neq 1$.

After the eigenvalues have been calculated as described above, a linear system may be formulated to solve for the eigenvectors, for example, as follows:

$$C(1, x_0, x_1, \ldots, x_{n-2})^T = \lambda(1, x_0, x_1, \ldots, x_{n-2})^T \quad \text{Equation 31}$$

where, as described above, n represents the dimension of the square matrix and $\lambda$ represents the eigenvalues. Those of ordinary skill will recognize that $x_0, x_1, \ldots, x_{n-2}$ may be determined, for example, using Gaussian elimination. The normalized vector $v = (1, x_0, x_1, \ldots, x_{n-2})^T$ is the eigenvector corresponding to the eigenvalue $\lambda$. As described above, these vectors form a KLT matrix. For example, for the exemplary trace embodiment including 25 pixels described above, the 5×5 KLT matrix $T = (1, v_0, v_1, v_2, v_3)^T$.

As described above, preferred embodiments of the invention utilize a non-orthogonal, fixed point, KL-like transformation that meet the criteria set forth in Equations 2 and 3. Such transformation matrices may be acquired by truncating the KLT matrix obtained in the preceding paragraph. The truncation process may be iteratively applied until a transformation matrix meeting the criteria set forth in Equations 2 and 3 is obtained. An optimum truncation process may also be selected.

In exemplary embodiments in which the forward transform matrix is determined downhole (based on the distribution of the sensor data), $\alpha$ and $\beta$ may be transmitted to the surface system. The surface system may then apply the above procedure (as described above with respect to Equations 27-31) to determine the same KLT transformation matrix used in the downhole encoder (as well as an inverse transform matrix for use in decoding). In exemplary embodiments in which a KL-like transform is utilized, the surface system may also apply the same truncation process utilized downhole to obtain the same KL-like transform used in the downhole encoder. The coefficients $\alpha$ and $\beta$ are typically transmitted to the surface as floating point numbers to ensure sufficient accuracy. The invention is not limited to any number of bits required to encode and transmit $\alpha$ and $\beta$. While the transmission of $\alpha$ and $\beta$ tends to result in communication overhead, it should be noted that in practical LWD applications the transformation matrix is not frequently changed and that the coefficients $\alpha$ and $\beta$ only need to be transmitted upon a change in transformation matrix. Such a change in the transformation matrix may be desirable, for example, at a boundary between two distinct formations.

Depending upon the available bandwidth of the telemetry system, it may be preferable to utilize fixed (constant) transforms (stored, for example, in downhole firmware) to avoid any additional overhead. Exemplary fixed transforms are disclosed above in JOINT TRANSFORM AND QUANTIZATION. The KL-like transformation matrices disclosed in Equations 4-9 and 11-12 were derived using the above described methodology. It has been observed that preferred transform matrices are often identical (or nearly identical) so long as $\alpha > \beta$ (which is often the case for LWD imaging applications). Thus, for many LWD applications, use of a fixed transform (such as those described above) may provide for optimal transmission efficiency. Alternatively, multiple transforms may be stored in downhole firmware and the methodology described above utilized to select the optimum one of those transforms.

Source Data Preprocessing

It will be appreciated that it is desirable for a downhole imaging sub LWD (e.g., imaging sub 150 on FIG. 1) to be capable of supporting downhole imaging applications including various types of data (e.g., compensated density, PE, Gamma Ray, standoff, sonic, resistivity, etc.). Thus it is also desirable for the data compression codec to be capable of compressing and transmitting various types of input data. One way to accomplish this objective is to pre-process the incoming LWD to convert it to a standard format independent of data type. In one exemplary embodiment this pre-processing includes quantizing (i.e., digitizing) the source data prior to the transformation and quantization steps described above in JOINT TRANSFORMATION AND QUANTIZATION (e.g., immediate after step 302 on FIG. 3). Typically the source data is received in the form of a plurality of floating point values (e.g., a single trace including multiple pixels, each of which is a floating point value). In one exemplary embodiment of the invention, a fixed point transformation may be applied in order to transform the incoming floating point data into a plurality of integer values within a predetermined dynamic range (i.e., having a fixed number of bits). The above described codec may be configured to compress and transmit the quantized data uphole. In this manner a single codec (for example as described above) may be utilized to compress and decompress most types of LWD data. Those of ordinary skill in the art will readily recognize that this approach in utilizing a fixed point transform advantageously eliminates truncation error loss.

In one exemplary embodiment of the invention, a Lloyd-Max Quantizer (LMQ) may be utilized to quantize the incoming sensor data. The pixel depth (i.e., the number of bits per pixel) is determined by the DSP word length and the transform expansion bits as described above. For example, for use with a two-dimensional 4×4 transform (e.g., as shown in Equation 8), a pixel depth of 7 bits (128 levels) may be achieved when using a 16-bit DSP. At the surface, a Lloyd-Max dequantization (LMdeQ) process is applied to recover the formation data in floating point representation (e.g., after step 406 in FIG. 4).

In one exemplary embodiment the LMQ determines the quantized output as follows:

$$\pm \frac{(2j+1)A}{2^R}, \text{ for } j = 1, 2, \ldots, 2^{R-1} \qquad \text{Equation 32}$$

where the source data is within an interval [−A, A] and R represents the pixel depth (i.e., the number of bits). Those of ordinary skill in the art will readily recognize that the LMQ and/or LMdeQ may be readily achieved via a look-up table as well.

It will be appreciated that such source data preprocessing advantageously enables a field engineer (or drilling operator) to adjust the source interval (the dynamic range) based on local formation characteristics and the nature of the particular LWD measurements.

Although the present invention and its advantages have been described in detail, it should be understood that various changes, substitutions and alternations can be made herein without departing from the spirit and scope of the invention as defined by the appended claims.

I claim:

1. A method for logging a subterranean borehole, the method comprising:

(a) acquiring a pixilated trace of sensor data, the pixilated trace including a plurality of borehole parameter values at a corresponding plurality of discrete tool face angles;
(b) causing a downhole processor to apply a non-orthogonal, KLT-like transform to the pixilated trace to obtain transform coefficients, the transform being selected such that the transform times its transpose equals a diagonal scaling matrix;
(c) causing the downhole processor to quantize the transform coefficients to obtain quantized coefficients; and
(d) transmitting the quantized coefficients uphole.

2. The method of claim 1, wherein the pixilated trace of sensor data is reorganized to obtain a two-dimensional square matrix of parameter values and (b) comprises causing the downhole processor to apply a two-dimensional transform to the parameter values to obtain a two-dimensional square matrix of transform coefficients.

3. The method of claim 2, wherein the transform is selected from the group consisting of:

$$\begin{pmatrix} a & a & a \\ b & -2b & b \\ c & 0 & -c \end{pmatrix};$$

$$\begin{pmatrix} a & a & a & a \\ b & c & -c & -b \\ a & -a & -a & a \\ c & -b & b & -c \end{pmatrix};$$

$$\begin{pmatrix} a & a & a & a & a \\ b & -b & 0 & -b & b \\ c & -d & 0 & d & -c \\ e & e & -4e & -e & -e \\ d & -c & 0 & c & -d \end{pmatrix}; \text{ and}$$

$$\begin{pmatrix} a & a & a & a & a & a & a & a \\ b & c & d & e & -e & -d & -c & -b \\ f & g & -g & -f & -f & -g & g & f \\ c & -e & -b & -d & d & b & e & -c \\ a & -a & -a & a & a & -a & -a & a \\ d & -b & e & c & -c & -e & b & -d \\ g & -f & f & -g & -g & f & -f & g \\ e & -d & c & -b & b & -c & d & -e \end{pmatrix}$$

where a, b, c, d, e, f, and g represent positive rational numbers.

4. The method of claim 1, wherein (b) comprises causing the downhole processor to apply a one-dimensional transform to the pixilated trace to obtain a one-dimensional matrix of transform coefficients.

5. The method of claim 1, wherein each matrix element in the transform is selected from the group consisting of rational numbers and integers.

6. The method of claim 1, wherein scaling factors in the diagonal matrix are bounded rational numbers that are within a factor of two of each another.

7. The method of claim 1, wherein the scaling factors are applied during quantization in (c).

8. The method of claim 1, wherein (b) and (c) comprise fixed point operations.

9. The method of claim 1, wherein:

the pixilated trace of sensor data is separated into first and second blocks;

(b) comprises causing the downhole processor to apply a transform to each of the blocks to obtain first and second blocks of transform coefficients;
(c) comprises causing the downhole processor to quantize the transform coefficients in each block to obtain first and second blocks of quantized coefficients; and
(d) comprises transmitting the first and second blocks of quantized coefficients uphole.

10. The method of claim 9, wherein each of the first and second blocks of sensor data is a two-dimensional square matrix.

11. The method of claim 9, wherein the first block of sensor data is a two-dimensional square matrix and the second block of sensor data is a one-dimensional matrix.

12. The method of claim 2, further comprising:
(e) de-quantizing the quantized coefficients at the surface to obtain reconstructed de-quantized coefficients; and
(f) inverse transforming the reconstructed de-quantized coefficients at the surface to obtain reconstructed sensor data.

13. The method of claim 12, further comprising:
(g) re-organizing the reconstructed sensor data to obtain a reconstructed trace.

14. A method for logging a subterranean borehole, the method comprising:
(a) acquiring a plurality of pixilated traces of sensor data, each of the pixilated traces including a plurality of borehole parameter values at a corresponding plurality of discrete tool face angles;
(b) causing a downhole processor to re-organize the plurality of borehole parameter values in the plurality of traces to obtain a square matrix of parameter values, the size of the square matrix being greater than the number of pixilated traces acquired in (a);
(c) causing the downhole processor to apply a non-orthogonal, KLT-like transform to the square matrix of parameter values to obtain a square matrix of transform coefficients, the transform being selected such that the transform times its transpose equals a diagonal scaling matrix;
(d) causing the downhole processor to quantize the transform coefficients to obtain quantized coefficients; and
(e) transmitting the quantized coefficients uphole.

15. The method of claim 14, wherein the number of pixilated traces acquired in (a) is less than or equal to four.

16. The method of claim 14, further comprising:
(f) de-quantizing the quantized coefficients at the surface to obtain reconstructed de-quantized coefficients;
(g) inverse transforming the reconstructed de-quantized coefficients at the surface to obtain reconstructed sensor data; and
(h) re-organizing the reconstructed sensor data at the surface to obtain a plurality of reconstructed traces.

17. A method for logging a subterranean borehole, the method comprising:
(a) acquiring at least one pixilated trace of sensor data, the pixilated trace including a plurality of borehole parameter values at a corresponding plurality of discrete tool face angles;
(b) causing a downhole processor to process the at least one pixilated trace of sensor data to obtain a transform matrix;
(c) causing the downhole processor to apply the transform matrix obtained in (b) to the at least one pixilated trace of sensor data to obtain transform coefficients;
(d) causing the downhole processor to quantize the transform coefficients to obtain quantized coefficients; and
(e) transmitting the transform matrix and the quantized coefficients uphole.

18. The method of claim 17, wherein:
the transform matrix is defined by first and second parameters; and
(e) comprises transmitting the first and second parameters and the quantized coefficients uphole.

19. The method of claim 18, wherein the first parameter is a mathematical correlation between nearest neighbor pixels in the at least one pixilated trace of sensor data and the second parameter is a mathematical correlation between second nearest neighbor pixels in the at least one pixilated trace of sensor data.

20. The method of claim 18, further comprising:
(f) processing the first and second parameters at the surface to obtain the transform matrix and a corresponding inverse transform matrix;
(g) de-quantizing the quantized coefficients at the surface to obtain reconstructed de-quantized coefficients; and
(h) utilizing the inverse transform matrix obtained in (f) to inverse transform the reconstructed de-quantized coefficients to obtain reconstructed sensor data.

21. The method of claim 17, wherein (b) further comprises:
(i) causing the downhole processor to process the sensor data to obtain a covariance matrix; and
(ii) causing the downhole processor to process the covariance matrix to obtain the transform matrix.

22. The method of claim 21, wherein the covariance matrix is selected from the group consisting of:

$$M_3 = \begin{pmatrix} 1 & e_1 & e_2 \\ e_1 & 1 & e_1 \\ e_2 & e_1 & 1 \end{pmatrix};$$

$$M_4 = \begin{pmatrix} 1 & e_1 & e_2 & e_3 \\ e_1 & 1 & e_1 & e_2 \\ e_2 & e_1 & 1 & e_1 \\ e_3 & e_2 & e_1 & 1 \end{pmatrix}; \text{ and}$$

$$M_5 = \begin{pmatrix} 1 & e_1 & e_2 & e_3 & e_4 \\ e_1 & 1 & e_1 & e_2 & e_3 \\ e_2 & e_1 & 1 & e_1 & e_2 \\ e_3 & e_2 & e_1 & 1 & e_1 \\ e_4 & e_3 & e_2 & e_1 & 1 \end{pmatrix};$$

wherein $M_3$, $M_4$, and $M_5$ represent 3×3, 4×4, and 5×5 covariance matrices, $e_1 = \alpha + \beta$, $e_2 = \alpha + \beta e_1$, $e_3 = \alpha e_1 + \beta e_2$, $e_4 = \alpha e_2 + \beta e_3$, $\alpha$ represents a mathematical correlation between nearest neighbor pixels in the at least one pixilated trace of sensor data, and $\beta$ represents a mathematical correlation between second nearest neighbor pixels in the at least one trace of pixilated sensor data.

23. The method of claim 21 wherein (b) (ii) further comprises causing the downhole processor to process the covariance matrix to obtain its eigenvalues and eigenvectors and further processing the eigenvectors to obtain the transform matrix.

24. The method of claim 23 wherein:
(b) (ii) further comprises causing the downhole processor to truncate the transform matrix to obtain a fixed point transform matrix; and
(c) comprises causing the downhole processor to apply the fixed point transform matrix obtained in (b) (ii) to the at least one pixilated trace of sensor data to obtain transform coefficients.

25. A method for logging a subterranean borehole, the method comprising:
(a) acquiring at least one pixilated trace of sensor data, the pixilated trace including a plurality of borehole parameter values at a corresponding plurality of discrete tool face angles;
(b) causing a downhole processor to quantize the at least one pixilated trace of sensor data to obtain quantized sensor data;
(c) causing the downhole processor to apply a non-orthogonal, KLT-like transform to the quantized sensor data to obtain transform coefficients;
(d) causing the downhole processor to quantize the transform coefficients to obtain quantized coefficients; and
(e) transmitting the quantized coefficients uphole.

26. The method of claim 25, wherein (b) further comprises causing the downhole processor to apply a Lloyd-Max Quantizer to the at least one pixilated trace of sensor data to obtain the quantized sensor data.

27. The method of claim 25, further comprising:
(f) de-quantizing the quantized coefficients at the surface to obtain reconstructed de-quantized coefficients;
(g) inverse transforming the reconstructed de-quantized coefficients to obtain reconstructed sensor data; and
(h) de-quantizing the reconstructed sensor data to obtain floating point sensor data.

28. A method for logging a subterranean borehole, the method comprising:
(a) acquiring at least one pixilated trace of sensor data, the pixilated trace including a plurality of borehole parameter values at a corresponding plurality of discrete tool face angles;
(b) causing a downhole processor to azimuthally partition the sensor data to obtain a plurality of blocks of sensor data, the plurality of blocks including a first block and at least one other block;
(c) causing the downhole processor to compute differences between each of the at least one other blocks and the first block to obtain at least one block of residuals;
(d) causing the downhole processor to apply a transform to the first block to obtain a first block of transform coefficients and to each of the at least one block of residuals to obtain at least one block of residual transform coefficients;
(e) causing the downhole processor to quantize the first block of transform coefficients and the at least one block of residual transform coefficients to obtain a first block of quantized coefficients and at least one block of residual quantized coefficients; and
(f) transmitting the first block of quantized coefficients and the at least one block of residual quantized coefficients uphole.

29. The method of claim 28, wherein:
steps (d), and (e) are applied to the first block prior to performing step (c);
obtaining a first reconstructed block of sensor data by using a downhole decoder to reconstruct the first block of quantized coefficients obtained in (e); and
(c) further comprises causing the downhole processor to compute differences between each of the at least one other block and the first reconstructed block to obtain at least one block of residuals.

30. The method of claim 28, further comprising:
(g) de-quantizing the quantized coefficients at the surface to obtain a first block of reconstructed de-quantized coefficients and at least one block of reconstructed de-quantized residuals;
(h) inverse transforming the first block of reconstructed de-quantized coefficients and the at least one block of reconstructed de-quantized residuals to obtain a first block of reconstructed sensor data and at least one block of reconstructed residuals;
(i) computing a sum of each of the at least one block of reconstructed residuals and the first block of reconstructed sensor data to obtain at least one other block of reconstructed sensor data.

31. The method of claim 30, further comprising:
(j) de-partitioning the first block of reconstructed sensor data and the at least one other block of reconstructed sensor data to obtain at least one pixilated trace of reconstructed sensor data.

32. The method of claim 28, wherein the transform applied in (d) comprises a non-orthogonal, fixed point, KL-like transform.

* * * * *